United States Patent [19]
Nakao

[11] Patent Number: 5,848,035
[45] Date of Patent: Dec. 8, 1998

[54] DISK PLAYBACK DEVICE AND METHOD OF CONTROLLING THE DEVICE

[75] Inventor: Koichi Nakao, Higashiosaka, Japan

[73] Assignee: Sanyo Electric Co., Ltd., Osaka, Japan

[21] Appl. No.: 759,009

[22] Filed: Dec. 2, 1996

[30] Foreign Application Priority Data

Nov. 30, 1995 [JP] Japan .................................. 7-312352

[51] Int. Cl.⁶ .................................................. G11B 17/22
[52] U.S. Cl. .............................................. 369/37; 369/33
[58] Field of Search ................................ 369/36, 37, 38, 369/30, 32, 42, 178; 711/173

[56] References Cited

U.S. PATENT DOCUMENTS

| | | | |
|---|---|---|---|
| 4,750,160 | 6/1988 | Miller et al. | 369/37 |
| 4,791,626 | 12/1988 | Staar | 369/37 |
| 4,827,462 | 5/1989 | Flannagan et al. | 369/32 |
| 5,214,626 | 5/1993 | Langman et al. | 369/37 |
| 5,282,183 | 1/1994 | Arifuku et al. | 369/36 |
| 5,305,295 | 4/1994 | Chu | 369/30 |
| 5,721,715 | 2/1998 | Mitani et al. | 369/33 |

*Primary Examiner*—Stuart S. Levy
*Assistant Examiner*—Tod Kupstas
*Attorney, Agent, or Firm*—Armstrong, Westerman, Hattori, McLeland & Naughton

[57] ABSTRACT

A magazine having a plurality of reset detecting portions arranged concentrically with the magazine and corresponding to disk accommodating spaces having respective predetermined identification numbers. A position index group is disposed between each two adjacent reset detecting portions for detecting the identification number of the particular disk space to which the reset detecting portion, toward the direction of rotation of the magazine, of the two portions corresponds. A sensor is provided on the path of rotation of the magazine on a chassis for detecting the reset detecting portions and position index groups. The sensor is connected to a processor for storing the identification number of the disk space as positioned in alignment with a path of movement of a disk. When the power source is turned on initially, the processor rotates the magazine temporarily, and detects from the number of recesses detected by a sensor the identification number of the disk space corresponding to the reset detecting portion subsequently detected by the sensor.

2 Claims, 22 Drawing Sheets

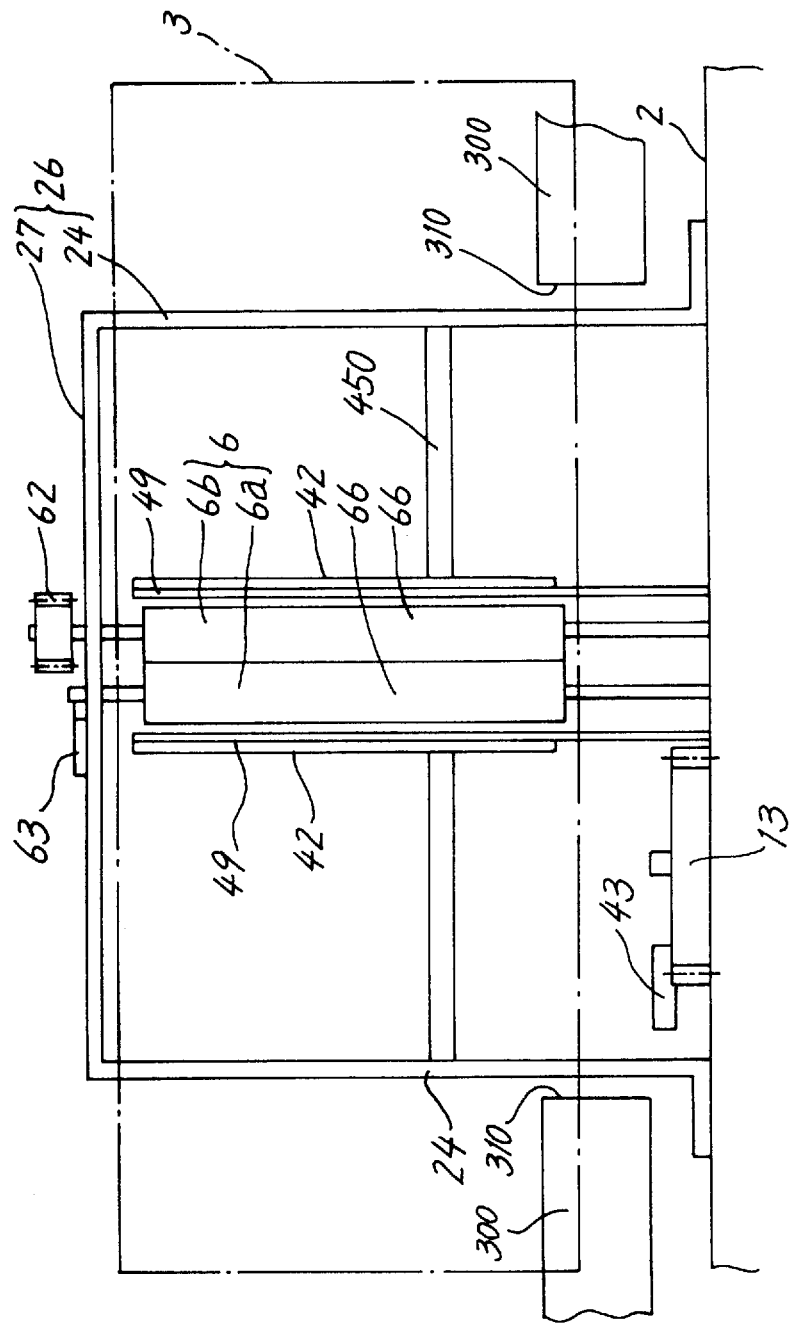

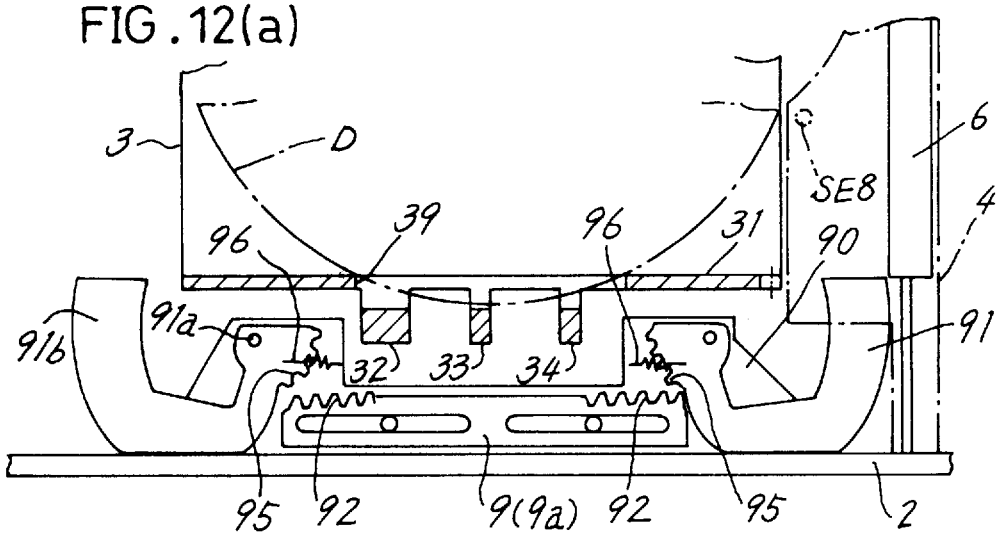
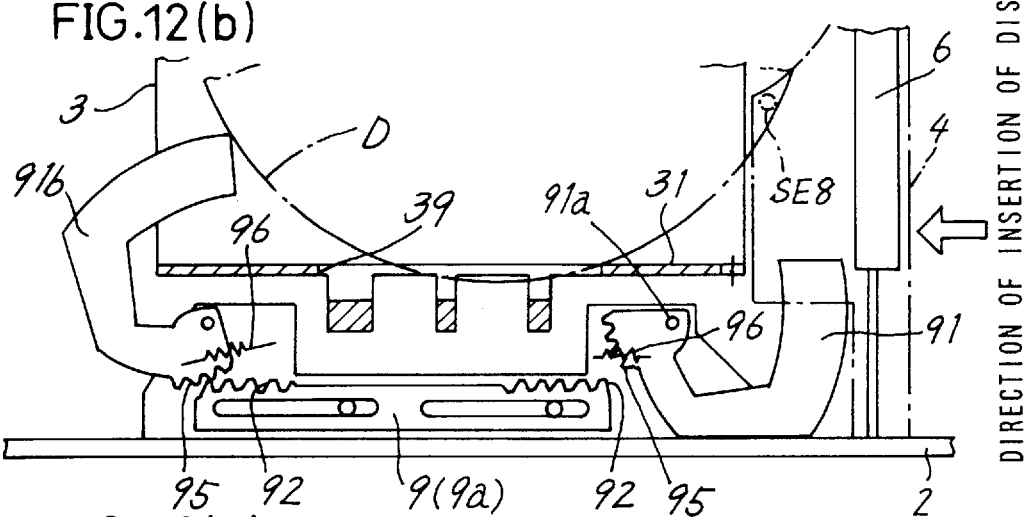
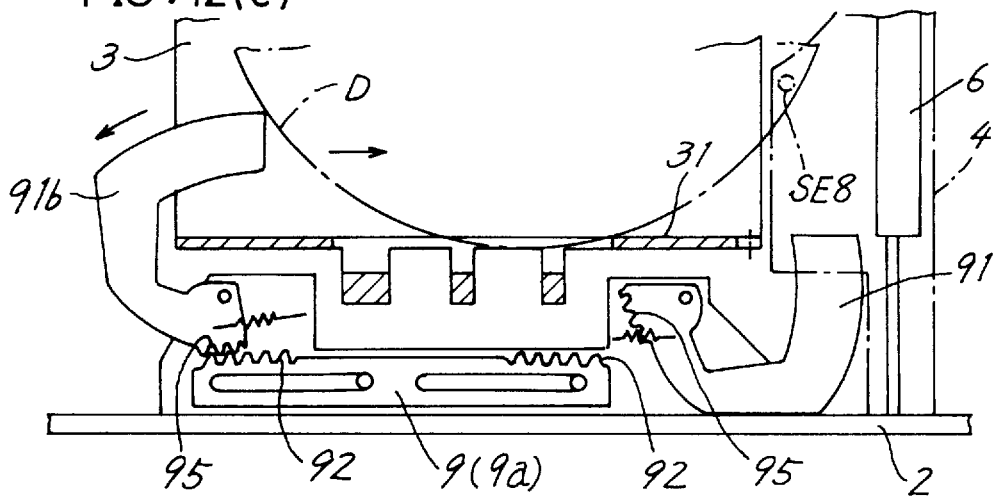

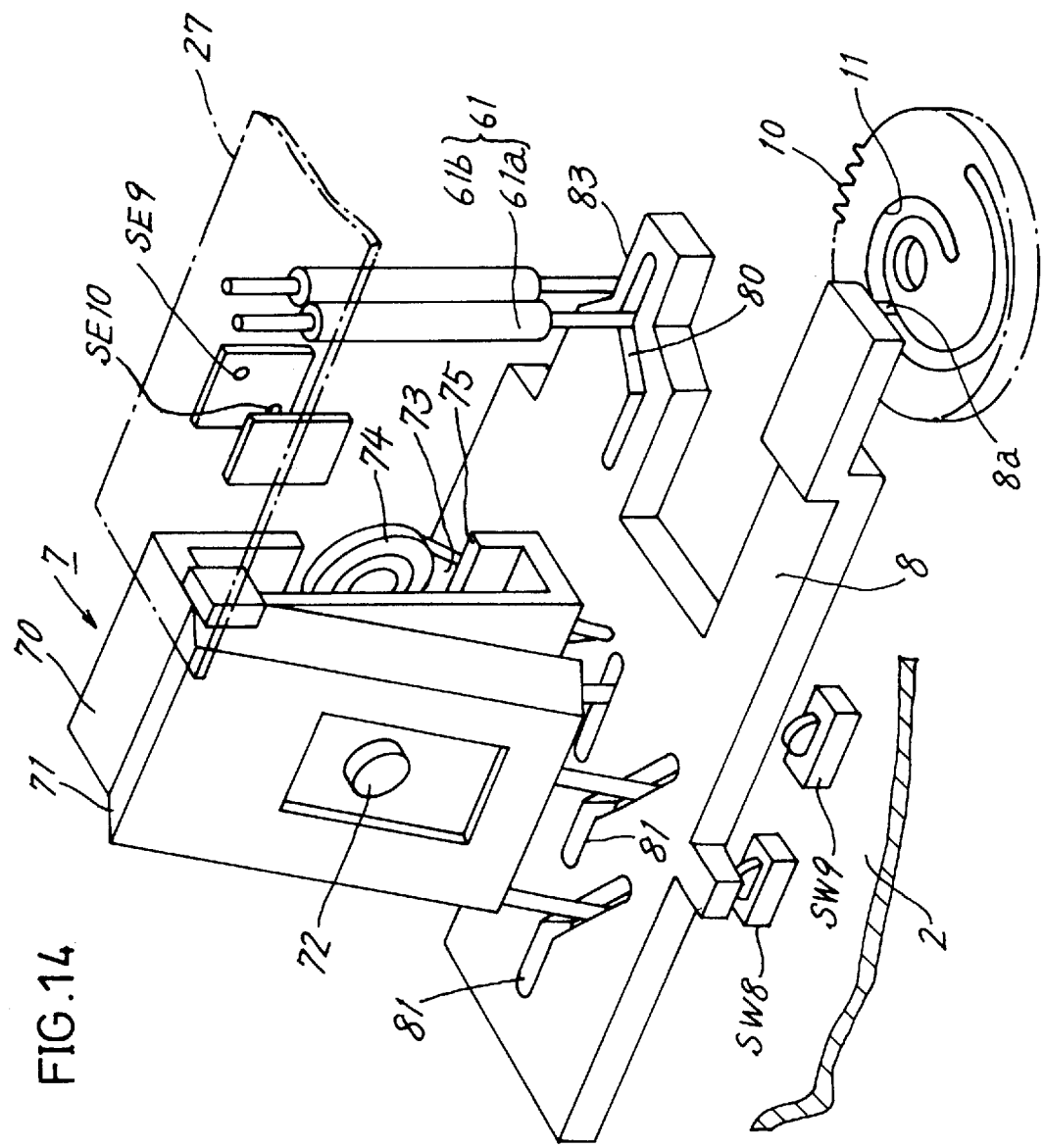

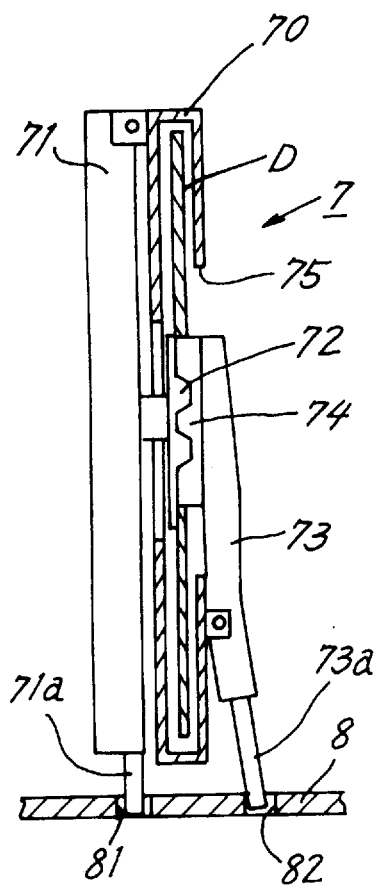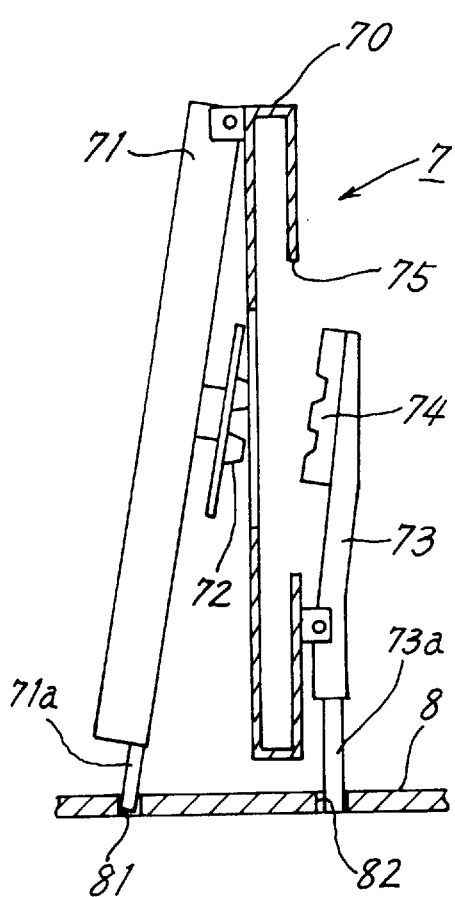

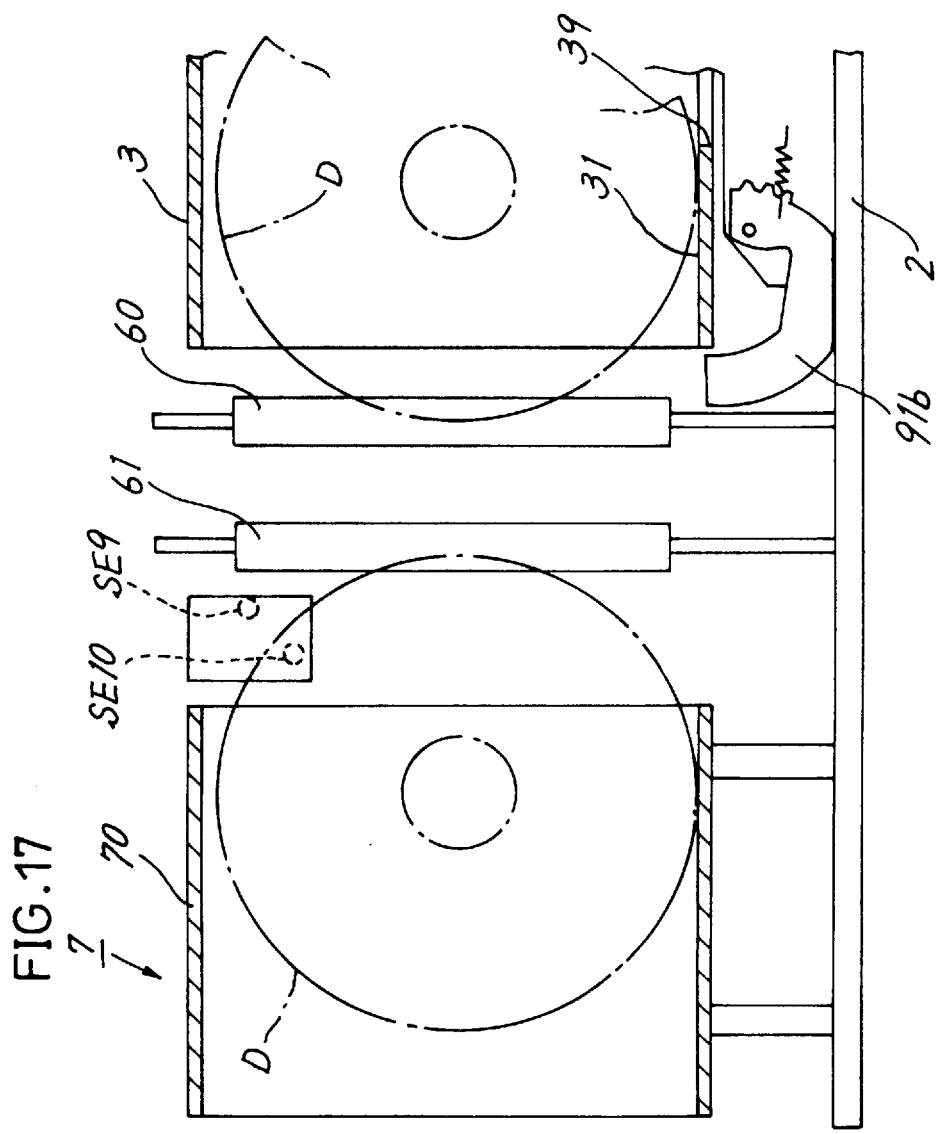

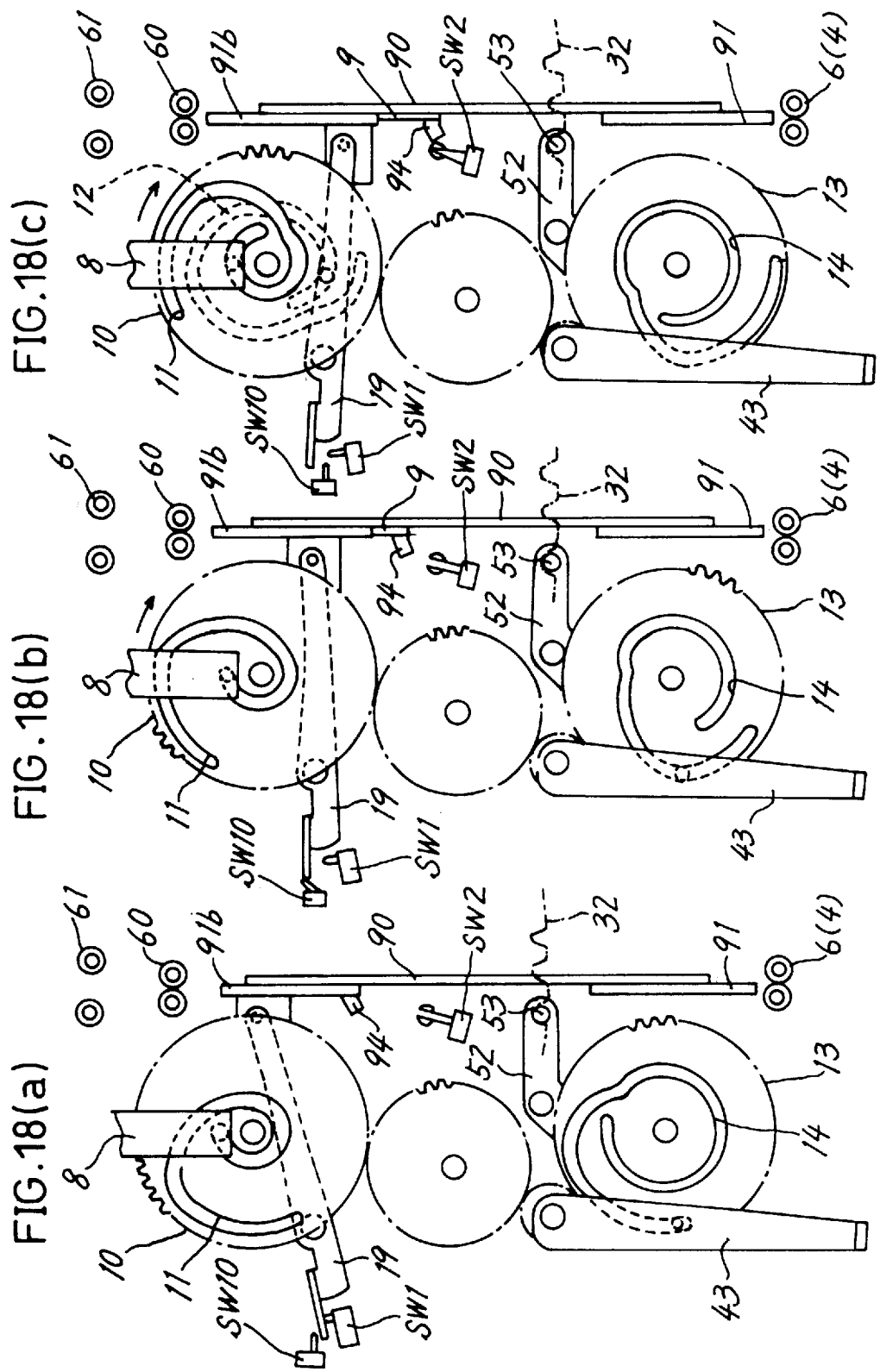

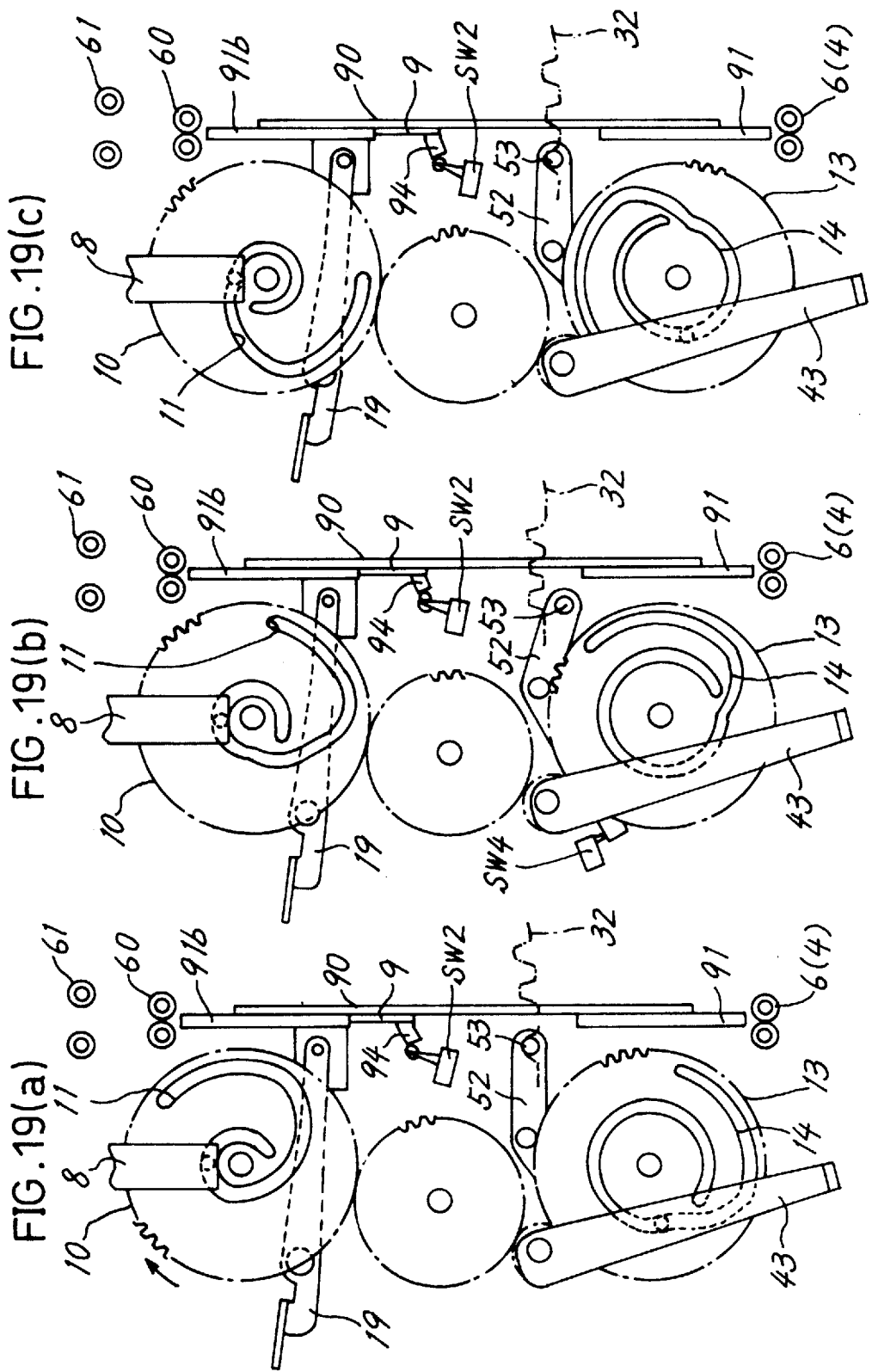

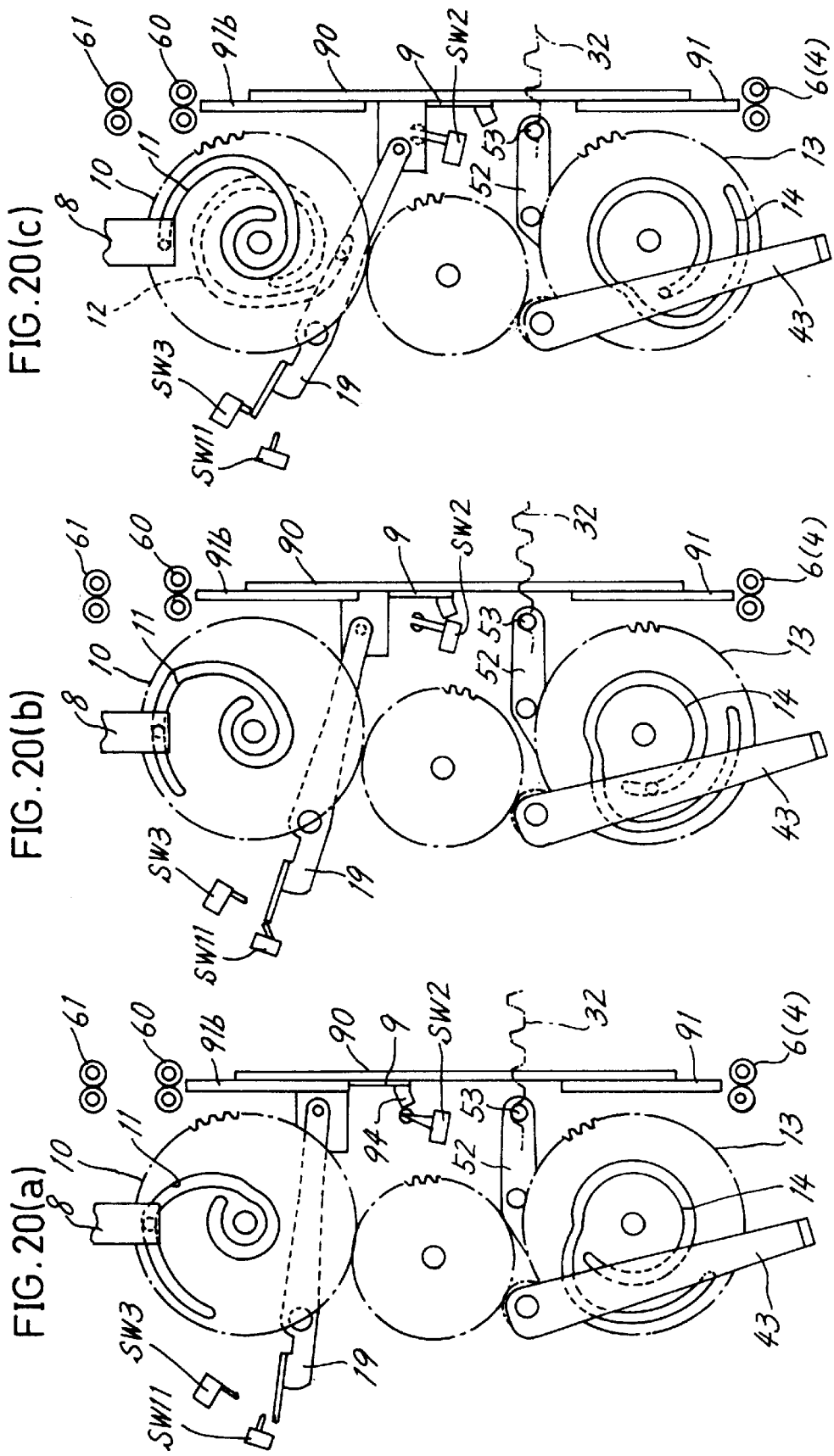

… …

DISK PLAYBACK DEVICE AND METHOD OF CONTROLLING THE DEVICE

BACKGROUND OF THE INVENTION

1. Field of the Invention

The present invention relates to disk playback devices of the so-called autochanger type adapted to accommodate a plurality of disks serving as recording media and to playback the desired disk, and to a method of controlling the device.

2. Description of the Related Art

Various autochanger-type playback devices have been proposed in which a plurality of disks are accommodated as positioned upright for playing back one of the disks desired. The present applicant also has already proposed the device shown in FIGS. 21 to 23 (see JP-A-195842/1994). In the following description, the direction in which the disk is inserted will be referred to as "front," and the direction of discharge of the disk as "rear."

The illustrated device has a magazine 3 rotatably mounted on a chassis 2 for accommodating disks D. A disk insertion-discharge portion 4 and a playback portion 7 spaced apart from one another are arranged outside the path of rotation of the magazine 3. The magazine 3 is formed with 24 disk spaces 31 arranged radially for accommodating disks D as positioned upright. The disk spaces 31 are numbered "1" to "24", respectively, as identification numbers in a counterclockwise order. A front panel 20 opposed to the insertion-discharge portion 4 has connected thereto a processor 200 having the memory function of storing the identification numbers of the respective disk spaces 31.

With reference to FIG. 23, the magazine 3 has a bottom wall formed with an annular toothed face 320. A motor M1 for driving the magazine 3 is coupled to the toothed face 320 by two intermediate gears 330, 340. Two holes 350, 350 are formed in the intermediate gear 340 on a diametrical line thereof. A sensor SE15 is disposed on the path of revolution of the holes 350. When the intermediate gear 340 meshing with the toothed face 320 makes a half rotation, the magazine 3 rotates by one disk space pitch, and the sensor SE15 detects the holes 350 to indicate the revolution of the disk space 31 by one pitch.

The bottom wall of the magazine 3 has a contact plate 360 formed with an outward protrudent midportion 370. Mounted on the chassis 2 is a lever 380 close to the path of revolution of the contact plate 360. The lever 380 is biased by a spring 390 and has one free end projecting into the path of revolution of the protrudent portion 370. A sensor switch SW15 is disposed in the path of rotation of the other end of the lever 380. When the lever 380 is away from the contact plate 360, the switch SW15 is held depressed and turned on by the lever 380.

When the protrudent portion 370 is brought into contact with the lever 380 by the rotation of the magazine 3, the lever 380 rotates against the force of the spring 390, turning off the sensor switch SW15, No. 1 disk space 31 is so positioned as to be opposed to the insertion-discharge portion 4 at this time, and the processor 200 detects No. 1 disk space 31 as opposed to the portion 4.

When the data stored in the processor 200 has disappeared for one cause or another, the processor 200 causes the motor M1 to rotate until the sensor switch SW15 becomes off, whereby No. 1 disk space 31 is positioned as opposed to the insertion-discharge portion 4. The subsequent operation then follows.

With the conventional device, the magazine 3 is thus rotated until the sensor switch SW15 is turned off, so that if the magazine 3 is adapted to accommodate an increased number of disks, searching for identification numbers takes a longer period of time.

In this case, it appears useful to arrange a plurality of sensor switches SW15 on the path of rotation of the magazine 3 and to identify the particular disk space 31 opposed to the insertion-discharge portion 4 by detecting the operating state of one of the switches SW15, whereas the provision of the increased number of switches 15 leads to an increase in the number of components.

SUMMARY OF THE INVENTION

An object of the present invention is to make it possible to quickly detect the rotated position of the magazine by simple means when the device is energized after the data stored in the processor has disappeared.

A magazine for accommodating a plurality of disks in a radial arrangement is formed with a plurality of reset detecting portions 37 corresponding to a plurality of specified disk spaces 31 and arranged at equal spacings concentrically with the magazine 3. A position index group 38 comprising a plurality of position indexes 38a is arranged at an intermediate portion between each two adjacent reset detecting portions 37, 37. The groups 38 are different in the number of position indexes 38a included in the group. The distance M between opposite ends of each position index group 38 is always less than the distance L from each end of the group 38 to the reset detecting portion 37 closest to the end, i.e., M<L. Disposed on the path of rotation of the magazine 3 on a chassis 2 is a sensor SE2 connected to a processor 200 for detecting the reset detecting portions 37 and the position index groups 38 and stopping the rotation of the magazine upon detecting the reset detecting portion 37.

When the device is energized after the data stored in the processor has disappeared, the processor 200 rotates the magazine 3 first. Time is measured upon the sensor SE2 detecting the first position index 38a or reset detecting portion 37. The reset detecting portion 37 or position index group 38 is ignored which moves past within a predetermined period of time t0 longer than a period of time t1 taken for the passage of the longest of the distances M.

The magazine 3 continues its rotation after the lapse of the predetermined period to, and the position index group 38 next detected indicates what identification number the disk space 31 has to which space the reset detecting portion 37 to be detected subsequently to the detected group 38 corresponds.

With further rotation, the sensor SE2 detects this reset detecting portion 37, whereupon the processor 200 stops the rotation of the magazine 3. The identification number of particular disk space 31 opposed to the insertion-discharge portion 4 can be recognized with reference to the reset detecting portion 37 detected for stopping the magazine 3.

Thus, in stopping the magazine 3, the sensor SE2 detects the reset detecting portion 37 which corresponds to the disc space 31 of detected identification number, so that the rotated position of the magazine 3 is detectable by simple means. Furthermore the rotated position of the magazine 3 is determined by detecting one of the plurality of reset detecting portions 37, and is therefore detectable more quickly than in the conventional device.

BRIEF DESCRIPTION OF THE DRAWINGS

FIG. 11 is a front view of the same;

FIGS. 12, (a), (b) and (c) are side elevations in section showing a mechanism for inserting the disk into, or discharging the disk from, a disk space, (a) showing the disk as inserted, (b) showing the mechanism in a standby state and (c) showing the mechanism while kicking out the disk toward the playback portion;

FIG. 14 is a perspective view of the playback portion;

FIGS. 15, (a) and (b) are side elevations in section of a clamp and a pickup mount, (a) showing the clamp as fitted to the pickup mount, and (b) showing the clamp as moved away from the mount;

FIG. 17 is a left side elevation showing the positional relation between the magazine, second and third roller units and a case;

FIG. 18 is a plan view showing the operation of the disk transport mechanism;

FIG. 19 is a plan view showing the operation of the disk transport mechanism;

FIG. 20 is a plan view showing the operation of the disk transport mechanism;

DETAILED DESCRIPTION OF THE PREFERRED EMBODIMENT

[Brief Description of the Entire Device]

An embodiment of the present invention will be described below in detail with reference to the drawings.

Figure 1:
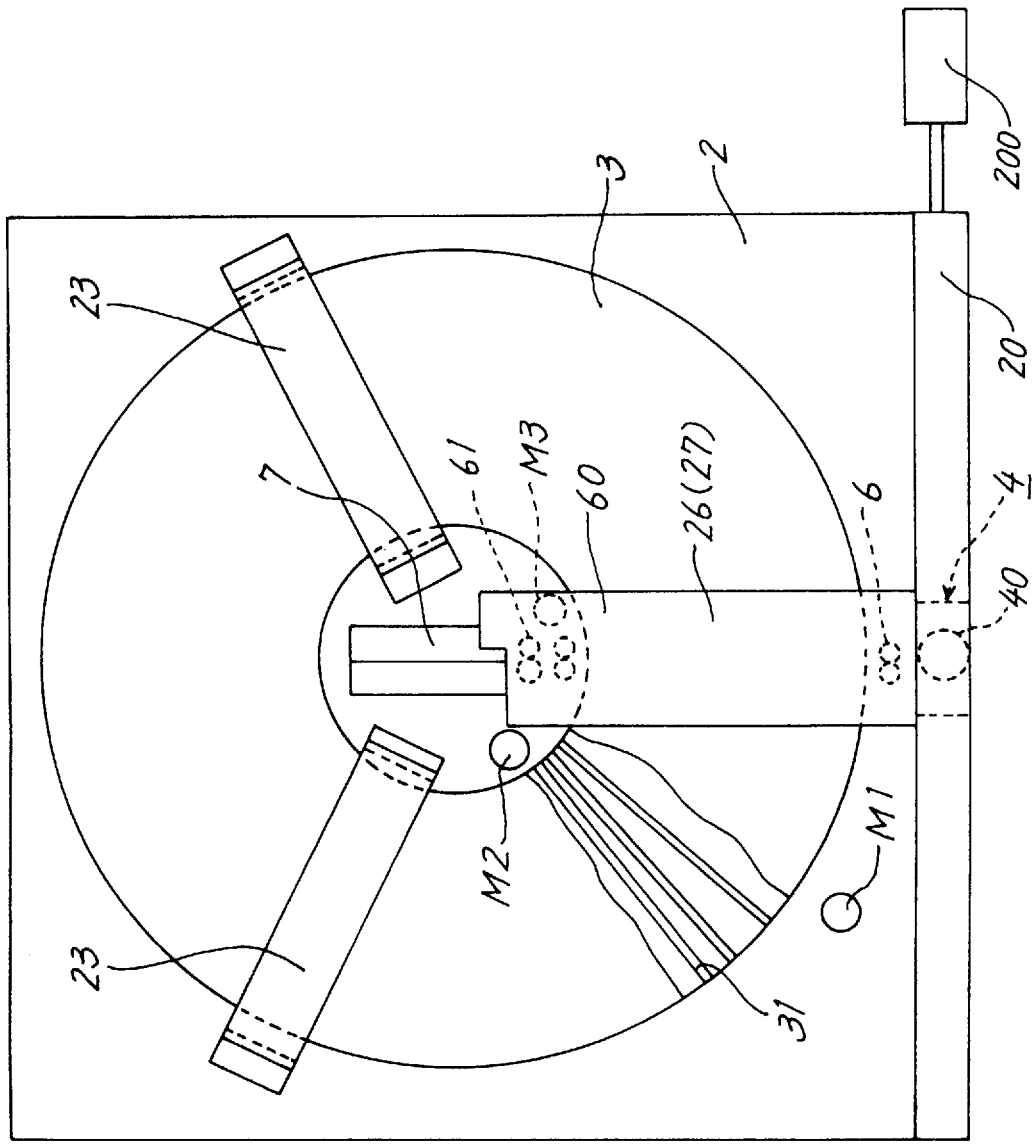
FIG. 1 is a plan view schematically showing a disk playback device.
Figure 2:
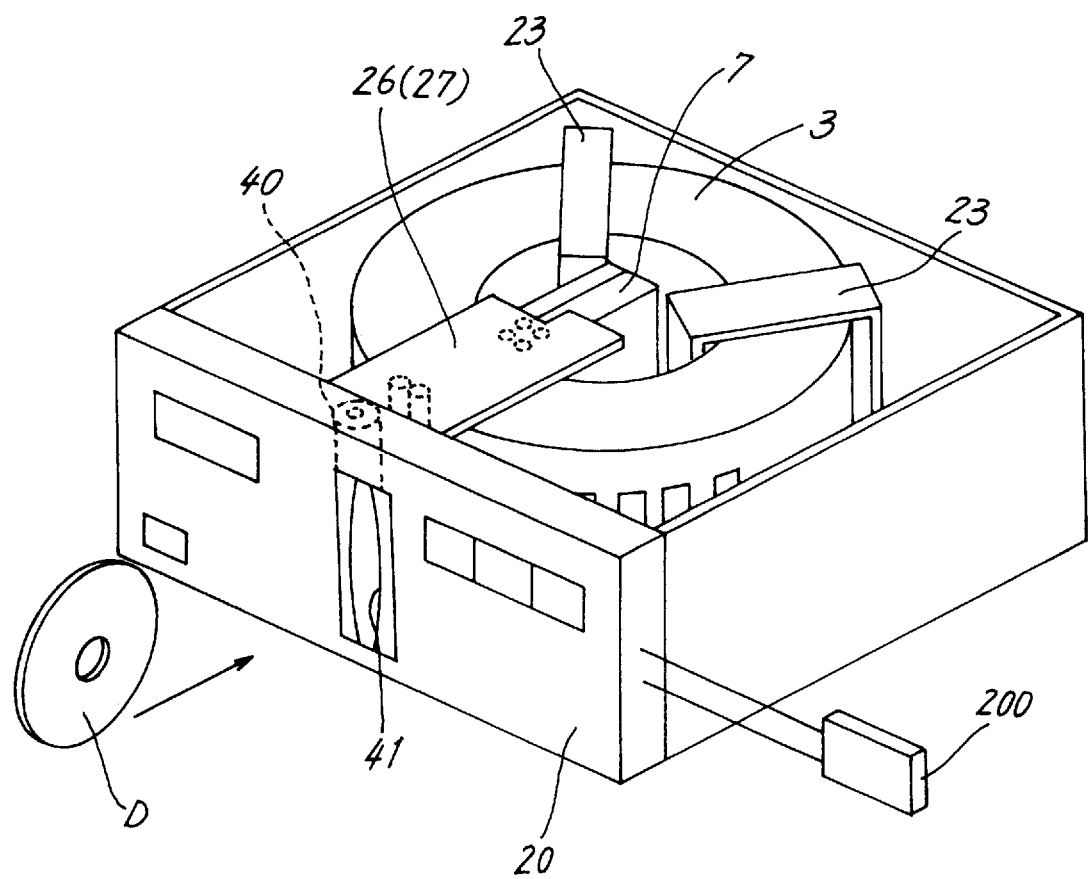
FIG. 2 is a perspective view of the same.

FIGS. 1 and 2 generally show the embodiment. A chassis 2 is provided at its front side with a front panel 20 having various operation buttons. Connected to the front panel 20 is a processor 200 having a memory function and having various command signals stored therein. The front panel 20 has at its center a rotary shutter 40 formed with an opening 41 for passing a disk D therethrough. Rotatably mounted on the chassis 2 is a magazine 3 in the form of a double cylinder for accommodating a plurality of disks D in a radial arrangement. A playback portion 7 is disposed inside the magazine 3. An insertion-discharge portion 4 is disposed outside the path of rotation of the magazine 3 and inside the front panel 20. The playback portion 7 is aligned with a path of transport of the disk from the insertion-discharge portion 4 to the playback portion 7. The disk D placed in from outside the front panel 20 passes through the rotary shutter 40 and then through the portion 4 and is accommodated in the magazine 3. The disk D is transferred from the magazine 3 to the playback portion 7, where the data recorded on the disk is regenerated.

A first roller unit 6 for holding and transporting the disk is provided within the insertion-discharge portion 4 and on the path of transport of the disk. Between the inner wall of the magazine 3 and the playback portion 7, second and third roller units 60, 61 for similarly holding the disk are arranged along the direction of insertion of the disk.

A motor M1 for rotating the magazine 3 is disposed outside the path of rotation of the magazine 3. Arranged in the hollow portion of the magazine 3 and between the insertion-discharge portion 4 and the playback portion 7 are a motor M2 for drivingly transporting the disk and a motor M3 for giving a torque to the three roller units 6, 60, 61. The motor M2 also drivingly rotates the rotary shutter 40. With the present disk playback device embodying the invention, therefore the three motors M1, M2, M3 are used for transporting the disk and rotating the magazine 3.

Figure 3:
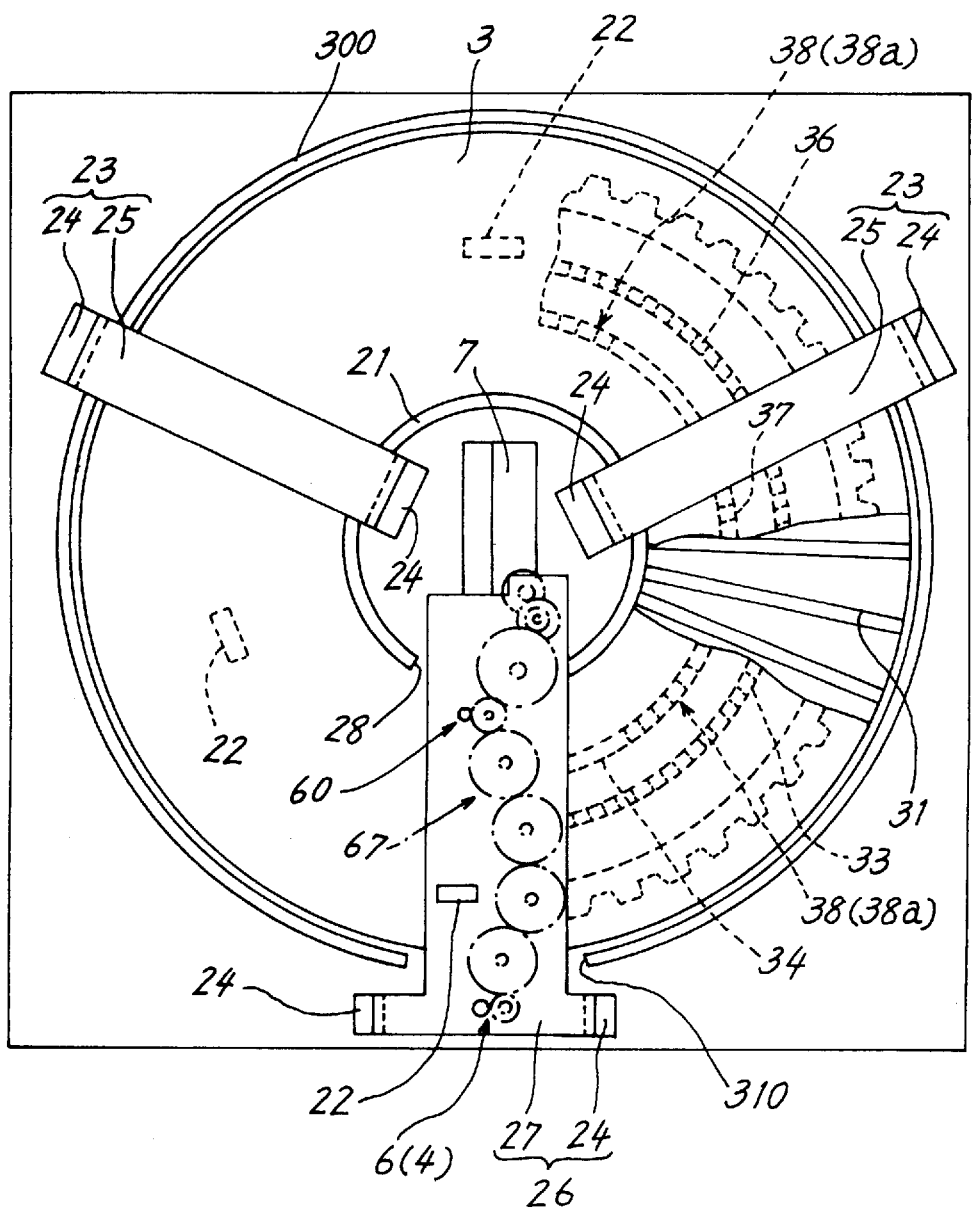
FIG. 3 is a plan view with a magazine partly broken away.

FIG. 3 is a plan view of the chassis 2 with the front panel 20 removed. The magazine 3 has a bottom wall rotatably fitted around a hollow cylindrical support post 21 provided upright on the chassis 2 and placed on support tires 22, 22 on the chassis 2. Also mounted on the chassis 2 is an escape preventing ring 300 surrounding the lower end of periphery of the magazine 3 for preventing the disks from slipping off from the magazine 3 (see FIG. 5). The support post 21 and the ring 300 are formed with cutouts 28, 310, respectively, at the portions thereof opposed to the insertion-discharge portion 4 for permitting the passage of the disk therethrough.

Attached to the chassis 2 are holding brackets 23, 23 extending over the magazine 3 from inside to outside thereof and a bracket 26 providing the insertion-discharge portion 4, these brackets 23, 26 being spaced apart from one another. Each of the holding brackets 23, 23 comprises legs 24, 24 positioned inside and outside the magazine 3, respectively, and secured to the chassis 2, and a retaining plate 25 interconnecting the upper ends of the legs 24, 24 integrally therewith and extending over the magazine 3.

The bracket 26 providing the insertion-discharge portion 4 comprises legs 24, 24 secured to the chassis 2 outside the magazine 3, and a support plate 27 interconnecting the upper ends of the legs 24, 24 integrally therewith, extending over the magazine 3 and connected to the playback portion 7.

As will be described further below, the present embodiment, i.e., the disk playback device, includes as mounted on the chassis 2 a magazine rotating mechanism 5, and a mechanism 1 for transporting the disk between the insertion-discharge portion 4 and the playback portion 7. A mechanism for rotating the roller units 6, 60, 61 are mounted on the upper surface of the support plate 27.

Figure 4:
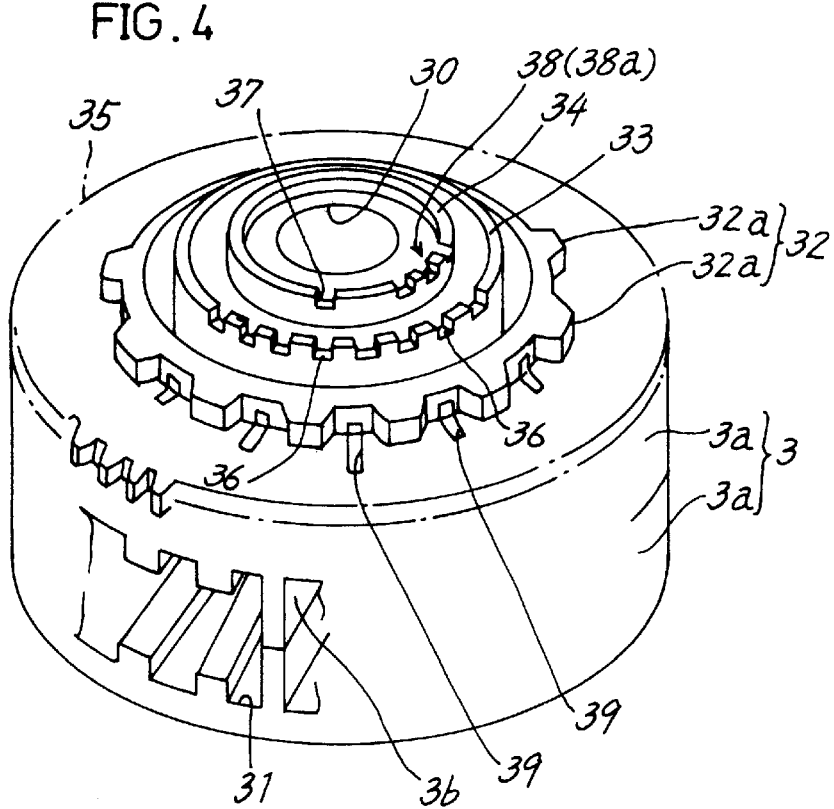
FIG. 4 is a perspective view showing the magazine as turned upside down.

FIG. 4 is a perspective view showing the magazine 3 as turned upside down. The magazine 3 has 150 disk spaces 31 formed in a radial arrangement for accommodating disks as positioned upright. Each of the disk spaces 31 has an open outer end in the shape of a slit 31a formed in the outer wall of the magazine 3 for permitting the disk to pass therethrough. The magazine 3 comprises two half segments 3a, 3a placed one over the other and joined by support walls 3b at required portions.

An annular toothed face 35 is formed on the bottom wall periphery of the magazine 3. Formed on the lower surface of the bottom wall of the magazine 3 concentrically therewith are a positioning ring 32, a first rib ring 33 and a second rib ring 34 as arranged inward from outside in this order. The positioning ring 32 is formed with positioning teeth 32a of specified pitch projecting radially outward of the ring and equal in number to the number of disk spaces 31. The first rib ring 33 has hollow windows 36 of specified pitch which are equal in number to the number of disk spaces 31 and correspond to the respective disk spaces 31. The second rib ring 34 is formed with reset detecting portions 37 each in the form of a recess and arranged at an angular interval of 60 deg about the center of rotation of the magazine 3. A position index group 38 is provided at an intermediate portion between each two adjacent reset detecting portions 37, 31.

The disk spaces 31 are given the identification numbers of No. 1 to No. 150, respectively, in a counterclockwise order when seen from above. The processor 200 has stored therein the corresponding relation of the six reset detecting portions 37 with respective No. 1, No. 26, No. 51, No. 76, No. 101 and No. 126 disk spaces 31.

Figure 24:
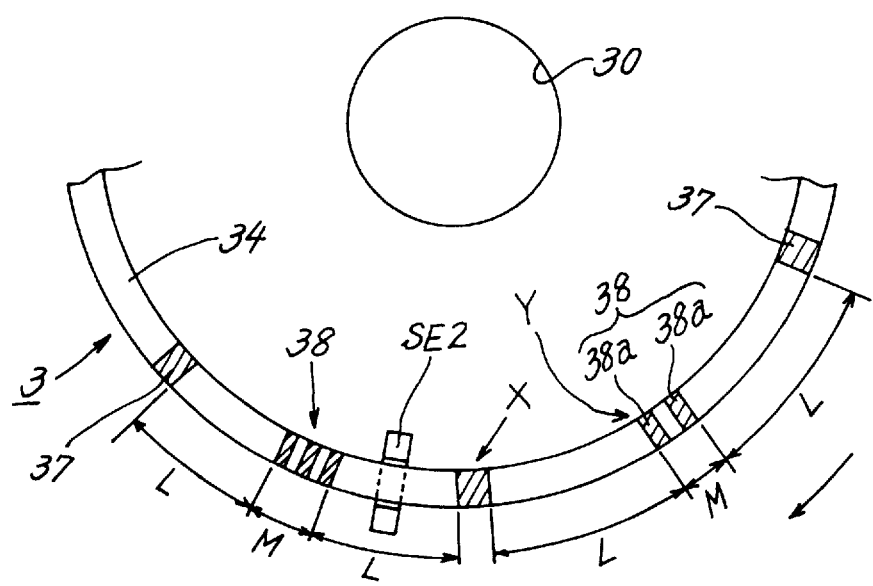
FIG. 24 is a plan view showing the positional relation between reset detecting portions of the magazine and position index groups thereof.

With reference to FIG. 3, the groups 38 comprise position indexes 38a equidistantly spaced apart along the second rib ring 34 and each in the form of a recess, and vary from 2 to 7 in the number of indexes 38a. FIG. 24 shows some of the reset detecting portions 37 and position indexes 38a as hatched areas. The position index groups 38 are so formed that starting with the first of these groups 38 which comprises two position indexes 38a, 38a, the number of position indexes 38a increases by one from group to group clockwise. The distance between opposite ends of each position index group 38 is indicated by M. Of all the groups 38, the group 38 comprising seven position indexes 38a is the greatest in the end-to-end distance M. The greatest distance M is always smaller than the distance L from each end of the group 38 to the reset detecting portion 37 closest to the end, i.e., M<L. Although FIG. 24 shows that the distances L from the ends of each position index group 38 to the respective closest reset detecting portions 37 are equal, the distances L may be different insofar as the distances L are greater than the end-to-end distance M.

The reset detecting portion 37 is used for detecting a position serving as the reference after the device is energized as will be described later. When the device is reset by turning on the power source initially, the magazine 3 temporarily rotates and comes to a halt at a position where one of the resent detecting portions 37 is detected. The position index group 38 is used for identifying the disk space 31 corresponding to that reset detecting portion 37.

The preset detecting portions 37 provided are six in number so as to quickly detect the reference position following the energization. Since the magazine 3 is adapted to accommodate 150 disks, the magazine 3 must be rotated as much as up to one turn for detecting the reference position if only one reset detecting portion 37 is provided. To simplify such a procedure, the six reset detecting portions 37 are provided. The portions 37 are not limited to six in number, insofar as at least two portions 37 are used.

Figure 5:
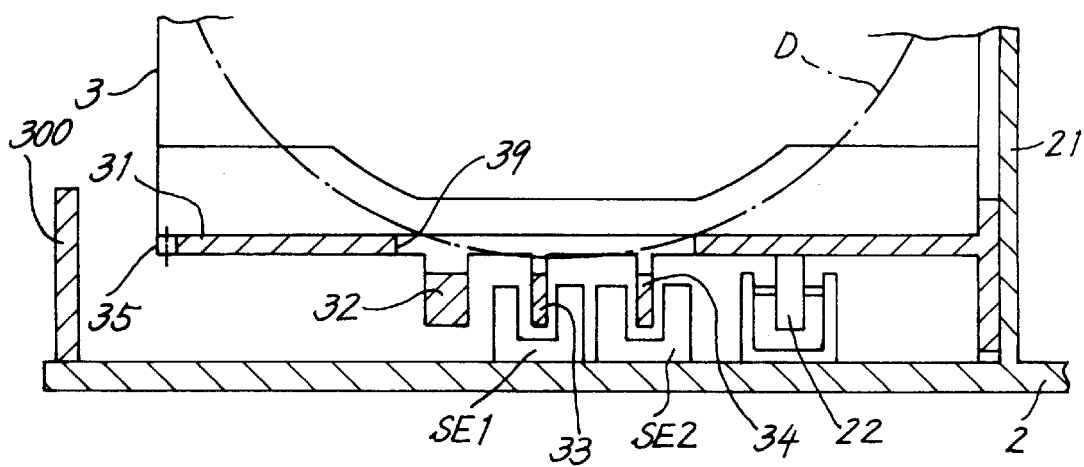
FIG. 5 is a side elevation in section showing the relation between the magazine and sensors with respect to position.

FIG. 5 is a side elevation showing the magazine 3 in section. The bottom wall defining each disk space 31 is formed with a holding groove 39 extending radially of the magazine 3 for fitting in the lower end of the disk. When placed into the magazine 3, the disk falls into the holding groove 39 under gravity, and the disk lower end is positioned at the lower side of the magazine 3. The disk is held in position in this state, with the peripheral edge of the disk in contact with opposite ends of the grooved portion 39.

Figure 8:
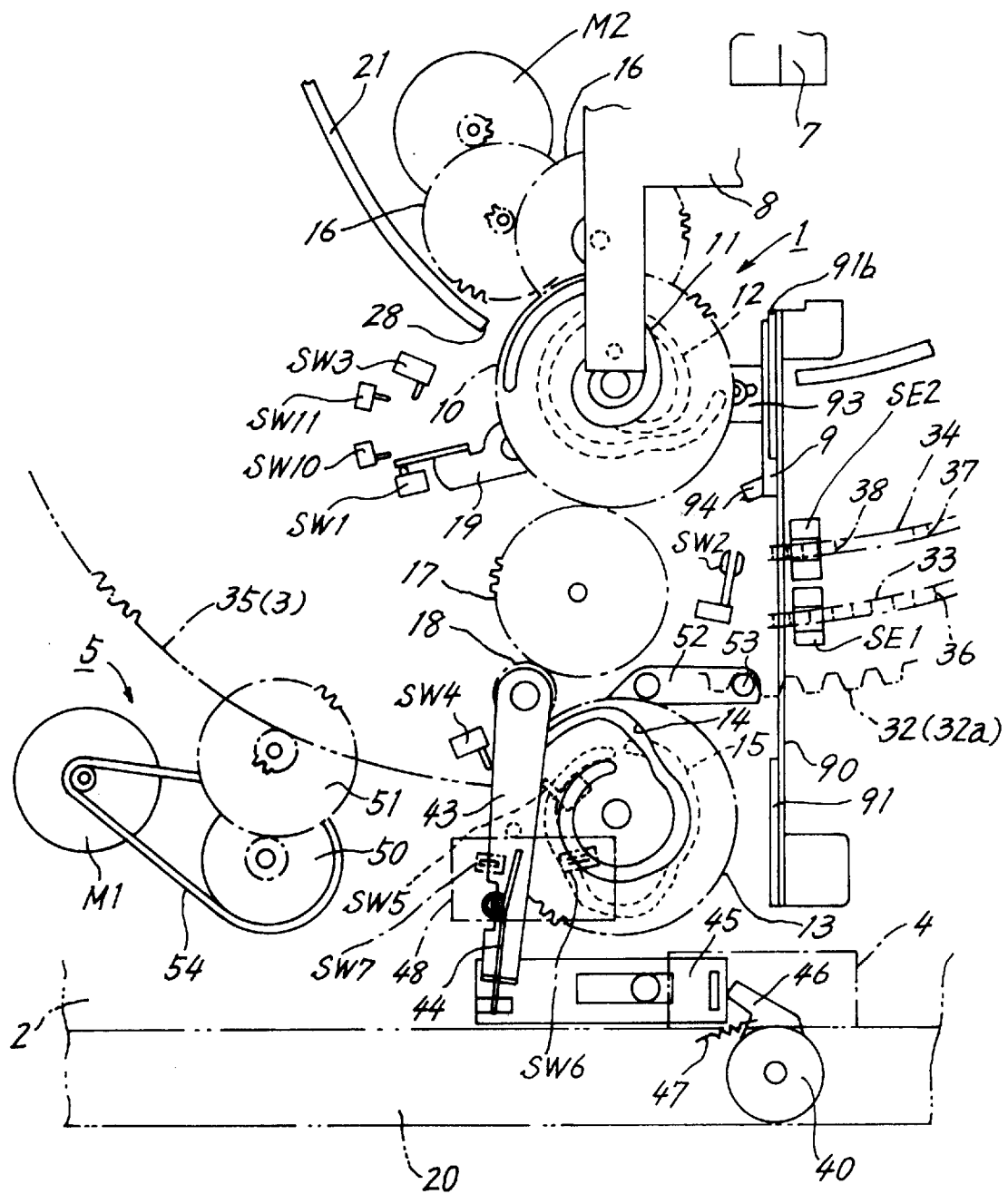
FIG. 8 is a plan view showing a magazine rotating mechanism, and a mechanism for transporting a disk between the insertion-discharge portion and a playback portion.

FIG. 8 is a plan view showing as mounted on the chassis 2 the magazine rotating mechanism 5 and the mechanism 1 for transporting the disk between the insertion-discharge portion 4 and the playback portion 7. The motor M1 disposed outside the path of rotation of the magazine 3 is coupled to the annular toothed face 35 of the magazine 3 by a belt 54 and two double gears 50, 51 to rotate the magazine 3 in accordance with an input from the front panel 20. Sensors SE1, SE2, each comprising a pair of photocouplers, are arranged on the paths of rotation of the respective first and second rib rings 33, 34 of the magazine 3. With the rotation of the magazine 3, reset detecting portions 37 and position index groups 38 are detected by the inner sensor SE2, and hollow windows 36 by the outer sensor SE1. The two sensors SE1, SE2 are positioned upstream away from the path of transport of the disk by one disk space pitch with respect to the direction of rotation of the magazine 3.

The hollow windows 36 of the magazine 3 are equal in number to the number of the disk spaces 31 and equidistantly spaced apart, so that when the sensor SE1 detects passage of one window 36 and thereafter detects passage of another window 36 immediately adjacent thereto, this indicates that the magazine 3 has rotated by one disk space pitch.

When the identification number of the disk space 31 opposed to the insertion-outlet portion 4 is entered from the front panel, the magazine 3 rotates by a number of disk space pitches corresponding to the input number. The identification number is stored in the processor 200 connected to the front panel 20.

When the device is to be re-energized after the data stored in the processor 200 has been mutilated for one cause or another, the processor is unable to realize which disk space 31 is currently opposed to the insertion-discharge portion 4.

Figure 9:
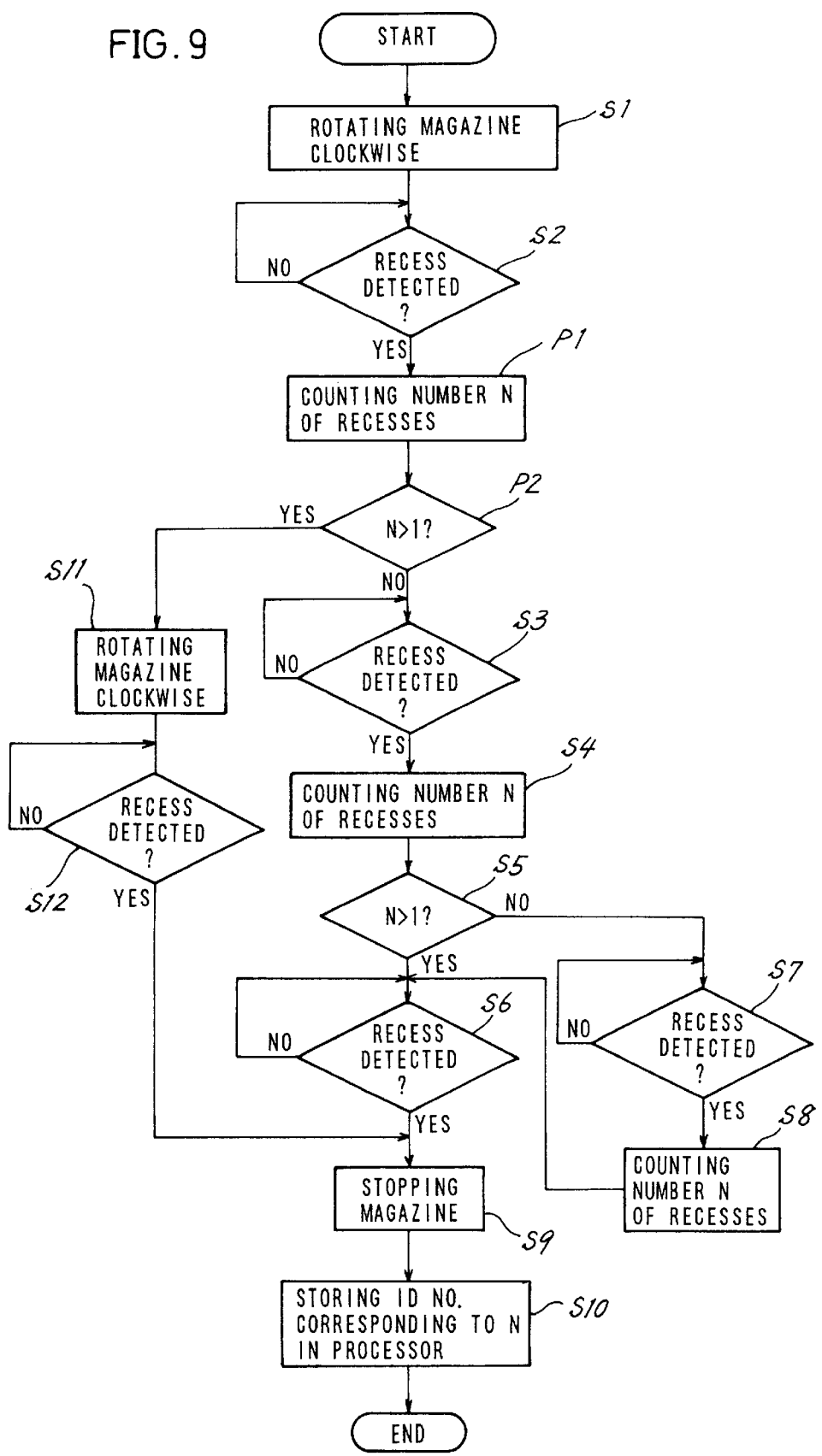
FIG. 9 is a flow chart showing the operation of a processor and the sensor following initial energization of the device.

In this case, the processor 200 performs the operation shown in the flow chart of FIG. 9 to detect one of the reset detecting portion 37 and position the disk space 31 of specified identification number as opposed to the insertion-discharge portion 4.

The motor M1 is first energized, rotating the magazine 3 clockwise at a constant speed (S1). The sensor SE2 detects the first recess 37 or 38a (S2), and then counts the number of recesses detected within a specified period of time t0 (P1). The time t0 will be described below. While the recess is a reset detecting portion 37 or position index group 38, the magazine 3 continues its rotation with the recesses counted within the predetermined period of time t0 neglected (P2). The recesses detected within the period t0 are ignored because there is a liklihood that the magazine 3 will be initially at a halt with one of the reset detecting portions 37 or position index group 38 opposed to the sensor SE2. Erroneous detection of the portion 37 must then be avoided by moving the portion 37 or the group 38 completely out of opposed relation with the sensor SE2.

With reference to FIG. 24, the period of time t0 is so predetermined that this period is longer than a period of time t1 taken for the position index group 38 with the greatest end-to-end distance M to move past the sensor SE2. The reason is that if the time t0 is shorter than the time t1 and when the sensor SE2 is initially opposed to the position index 38a positioned at the clockwise end of the above group 38 (see FIG. 24, Y), the number of position indexes 38a will not be detected correctly in step P1.

Further the time t0 is shorter than a period of time t2 taken for the position index 38a a distance L away from the reset detecting portion 37 to move past the sensor SE2 after the portion 37 has moved past the sensor SE2. The reason is that if the time t0 is longer than t2 and when the sensor SE2 is initially opposed to the reset detecting portion 37 positioned at point X in FIG. 24, the position index 38a of the group 38 positioned at point Y would be detected within the time t0, and an incorrect number would be counted in step P1.

When a plurality of recesses are detected by the sensor SE2 within the predetermined period of time t0 in step P1, this indicates that a position index group 38 is detected, showing that a reset detecting portion 37 will be detected next. However, it one recess is detected by the sensor SE2 within the period of time t0 in step S2, the recess is a reset detecting portion 37 or the position index 38a at the end of a group 38.

When a plurality of recesses are detected within the period of time t0 in step P2, the magazine 3 is further rotated (S11), followed by step S12 in which the number or recesses detected by the sensor SE2 within the period t0 is counted again. Since the recess to be detected subsequently is only one of the reset detecting portions 37, the rotation of the magazine 3 is stopped when this portion 37 is detected (S9).

The groups 38 differ in the number of position indexes 38a, so that the number of position indexes 38a of the group 38 detected in step P2 indicates the disk space 31 of particular identification number to which the reset detecting portion 37 detected in step S12 corresponds.

Since the sensor SE2 is positioned one disk space pitch away from the path of transport of the disk as previously stated, the identification number of the disk space 31 opposed to the insertion-discharge portion 4 can be discerned. The processor 200 stored the identification number (S10).

If one recess is detected within the predetermined period of time t0 in step P2, the processor 200 operates in the following manner.

The magazine 3 is further rotated, allowing the sensor SE2 to detect a reset detecting portion 37 or position index 38a of group 38 (S3), whereupon the number N of recesses moving past the sensor within the subsequent period of time t0 is counted (S4).

When the number N counted in step 54 is greater than 1, what has moved past the sensor SE2 within the period t0 is not a reset detecting portion 37 but one of the position index groups 38. Accordingly, the count N indicates the position of the particular group 38 on the second rib ring 34. After the counted number N greater than 1 is detected (S5), the magazine 3 is further rotated, permitting the sensor SE2 to detect a reset detecting portion 37 (S6). The position index group 38 previously identified indicates the particular disk space 31 to which the reset detecting portion 37 detected corresponds. The processor 200 stops the magazine 3 and stores the identification number of the disc space 31 opposed to the insertion-discharge portion 4 (S10).

If the counted number N is found to be 1 in step S5, this indicates that one of the reset detecting portions 37 has moved past the sensor SE2, thus showing that a position index group 38 will be detected next. The recesses 38a of the group 38 detected in step S7 is counted (S8). The count identifies the position index group 38 detected by the sensor SE2, and the magazine 3 is stopped when a reset detecting portion 37 is subsequently detected (S6, S9). In this way, the magazine 3 is brought to a halt upon detecting the identification number of the disk space 31 opposed to the insertion-discharge portion 4 after the power source is turned on initially.

[Insertion-Discharge Portion]

Figure 6:
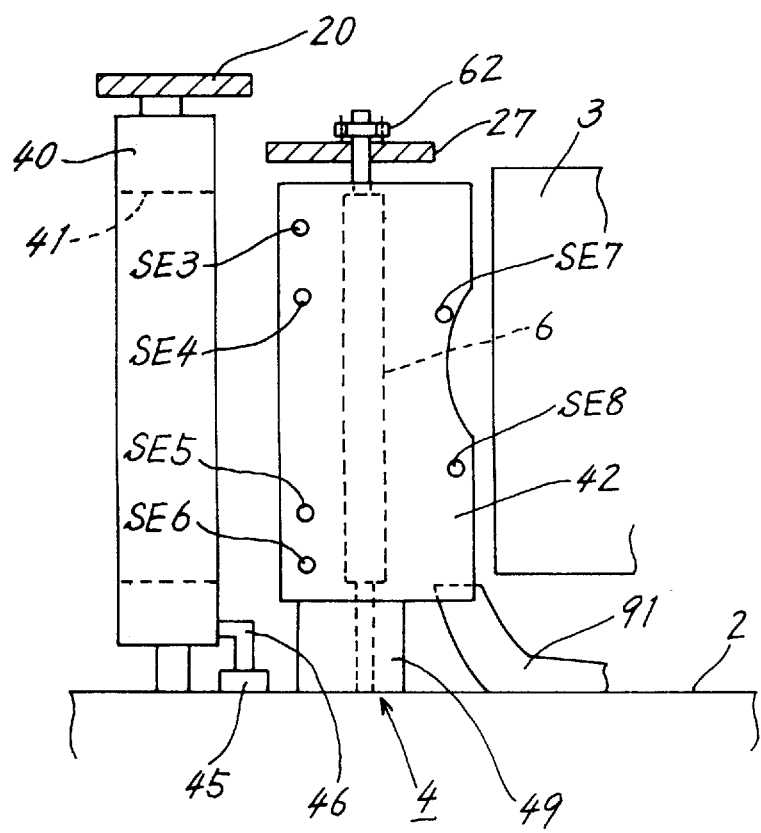
FIG. 6 is a right side elevation showing the positional relation between a rotary shutter, an insertion-discharge portion and the magazine.
Figure 10:
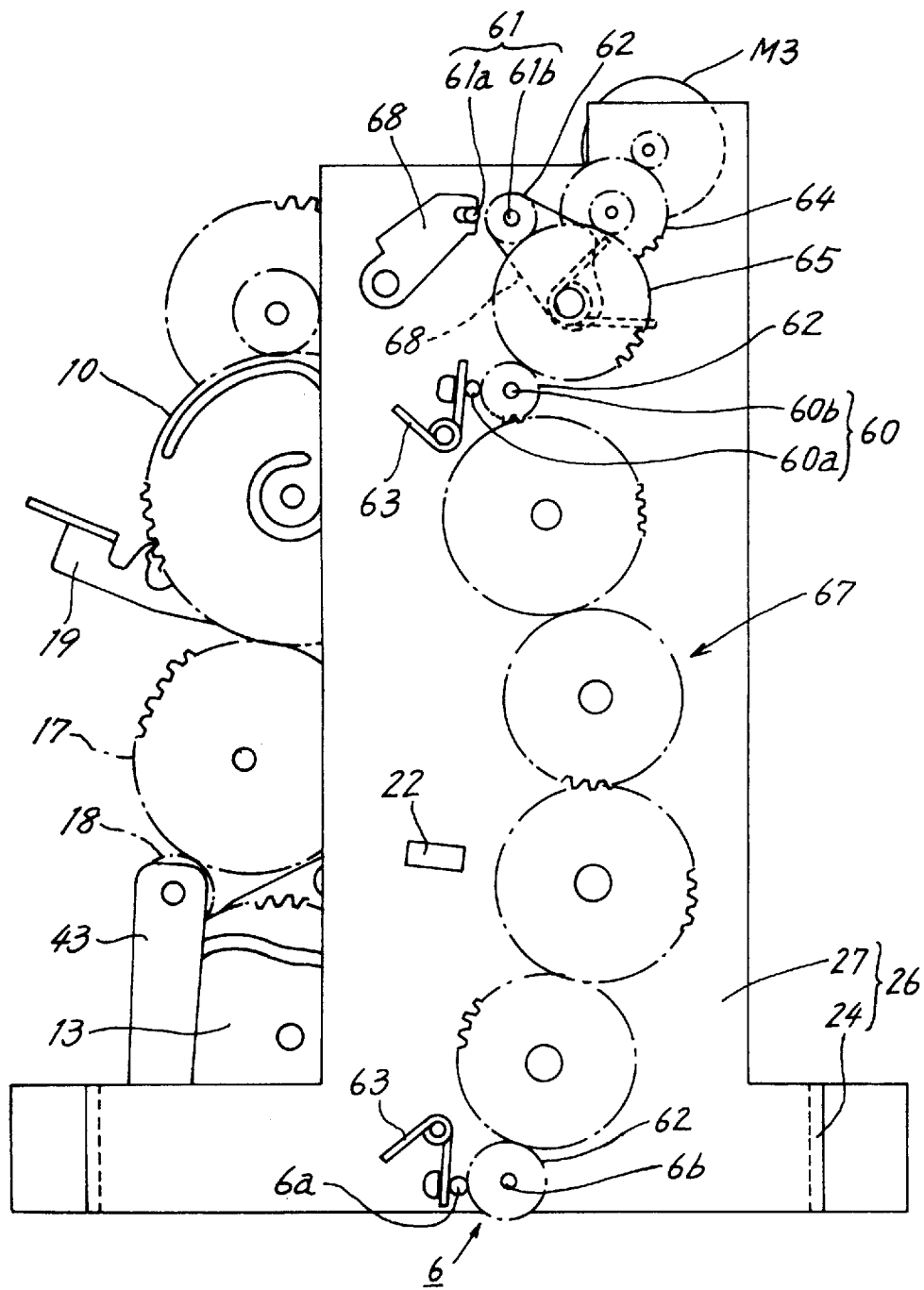
FIG. 10 is a plan view showing the rotary shutter and a roller rotating mechanism for transporting the disk.

FIG. 6 is a right side elevation of the insertion-discharge portion 4, FIG. 10 is a plan view of the support plate 27 of the bracket 26, and FIG. 11 is a front view of the same. The portion 4 has the first roller unit 6 provided at the rear end of support plate 27 of the bracket 26. Upstanding holding walls 49, 49 are arranged at respective opposite sides of the unit 6. Attached to the outer side of each wall 49 is a sensor base plate 42 provided with six sensors SE3 to SE8 for detecting passage of the disk through the holding wall 49.

Of the six sensors, the four sensors SE3 to SE6 are arranged in a vertical row, and the remaining two sensors SE7 and SE8 are arranged inwardly of the first roller unit 6. Such many sensors are provided to reliably detect the insertion of two kinds of disks, i.e., those having a diameter of 12 cm and those having a diameter of 8 cm.

With reference to FIG. 11, the first roller unit 6 comprises a pair of rollers 6a, 6b. The roller 6b at right Has a gear 62 at its upper end. The roller 6a at left has upper and lower ends fitting respectively to the bracket support plate 27 and the chassis 2 with a clearance formed therebetween. The roller 6a is movable toward and away from the roller 6b.

The roller 6a is pressed against the roller 6b by a torsion spring 63 mounted on the support plate 27. Incidentally, the second and third rollers units 60, 61 have the save construction as the first roller unit 6.

[Roller Rotating Mechanism]

With reference to FIG. 10, the motor M3 is mounted on the rear side of the support plate 27 and coupled to gears 62 of the second and third roller units 60, 61 by two intermediate gears 64, 65. The second and third roller units 60, 61 rotate in the same direction. The gear 62 on a roller 60b of the second roller unit 60 is coupled to the gear 62 on the roller 6b of the first roller unit 6 by a gear train 67 on the support plate 27. The first roller unit 6 and the second roller unit 60 rotate in directions opposite to each other.

Accordingly, when the rollers 6a, 6b of the first roller unit 6 so rotate as to draw the disk into the magazine 3, the rollers 60a, 60b of the second roller unit 60 so rotate as to draw the disk from the playback unit 7 toward the magazine 3. Conversely when the rollers 6a, 6b of the first roller unit 6 so rotate as to discharge the disk from the magazine 3, the rollers 60a, 60b of the second roller unit 60 so rotate as to discharge the disk from the magazine 3 toward the playback unit 7.

The third roller unit 61 comprises rollers 61a, 61b fitting to respective retainers 68, 68 pivoted to the support plate 27. The retainer 68 at right is biased toward the retainer 68 at left by a spring. The retainer 68 having fitted thereto the right roller 61b of the third roller unit 61 is supported by the same shaft as the intermediate gear 65. The motor M3, when rotated, rotates all the three roller units 6, 60, 61 through the gears 62 and the gear train 67.

[Disk Transport Mechanism]

The disk transport mechanism shown in FIG. 8 also rotates the rotary shutter 40. For convenience of description, the bracket 26 over the magazine 3 is not shown in FIG. 8.

At the left side of the path of transport of the disk, the motor M2 mounted on the chassis 2 inwardly of the magazine 3 is coupled to a first cam gear 10 provided inwardly of the cutout 28 of the support post 21 by two double gears 16, 16. The first cam gear 10 is coupled by two intermediate gears 17, 18 to a second cam gear 13 positioned in the vicinity of the insertion-discharge portion 4. The first cam gear 10 is formed with a first cam groove 11 in its front surface, and a second cam groove 12 in its rear surface. The second cam groove 12 has engaged therein a pivotal lever 19 supported on the chassis 2 and extending toward the path of transport of the disk. Inside the magazine 3, the first cam groove 11 has engaged therein a chuck slide 8 movable forward and rearward. As will be described later, the slide 8 engages with the playback portion 7.

A holding plate 90 extending in the front-rear direction is provided upright on the chassis 2 below the path of transport of the disk. The holding plate 90 is provided on its left side face with a drive slide 9 slidable in the front-rear direction. The drive slide 9 has racks 92, 92 at respective opposite ends of its upper portion (see FIG. 12), and a lug 93 projecting from its lower edge and in engagement with the forward end of the pivotal lever 19. The drive slide 9 has a pushing piece 94 projecting from the rear end thereof. An intermediate position sensor switch SW2 is disposed on the path of movement of the pushing piece 94.

Arranged on the path of pivotal movement of the other end of the lever 19 are a kickout sensor switch SW1, standby position sensor switch SW10, drawing sensor switch SW11 and transport completion sensor switch SW3. These switches SW1, SW10, SW11 and SW3 are used for detecting moved positions of the drive slide 9.

The second cam gear 13 is formed with a third cam groove 14 in its upper surface and a fourth cam groove 15 in its lower surface. A lock lever 52 pivotally supported on the chassis 2 is engaged in the fourth cam groove 15. The lock lever 52 has a projection 53 projecting upward from one end thereof and fitting in between positioning teeth 32a, 32a of the magazine 3, restraining the rotation of the magazine 3. A locking sensor switch SW5 and an unlocking sensor switch SW4 are arranged on the path of pivotal movement of the other end of the lock lever 52.

The third cam gear 14 has engaged therein an intermediate lever 43 having a forward end directed toward the front panel 20 and a base end supported by the same shaft as the intermediate gear 18. Provided on the forward end of the lever 43 is a torsion spring 44, one end of which is coupled to a shutter opening-closing slide 45 provided at a rear end portion of the chassis 2 and slidable rightward and leftward. A switch mount plate 48 is disposed above the path of rotation of the intermediate lever 43. Attached to the lower surface of the mount plate 48 are a shutter closing sensor switch SW6 and a shutter opening sensor switch SW7 which are to be depressed by the lever 43. The switches SW6 and SW7 indicate whether the rotary shutter 40 is closed or open.

Figure 7A:
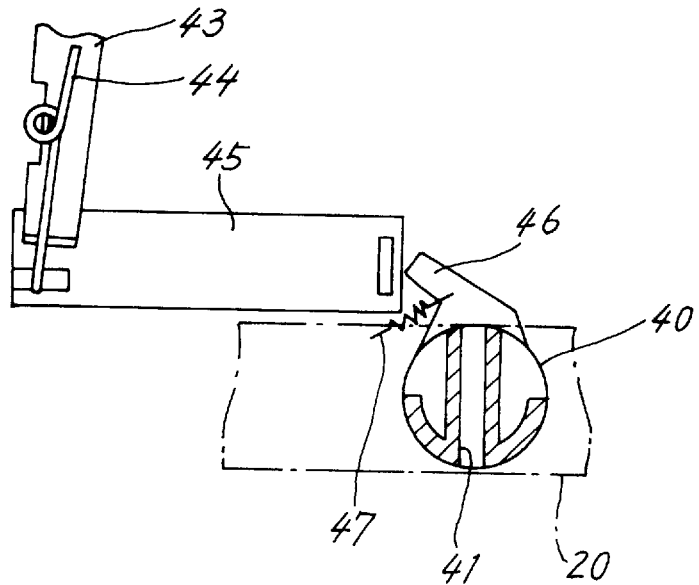
FIG. 7, (a) is a plan view of the rotary shutter as opened, and FIG. 7, (b) is a plan view of the shutter as closed.
Figure 7B:
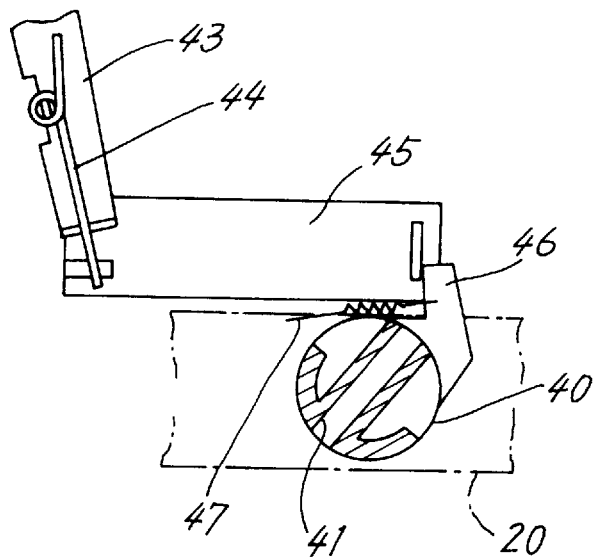

With reference to FIGS. 7, (a) and (b), the shutter 40 has a projection 46 projecting from its lower end. The shutter opening-closing slide 45 rotates the rotary shatter 40 by pushing the projection 46. A tension spring 47 smaller than the torsion spring 44 in biasing force is connected between the shutter 40 and the front panel 20, biasing the shutter 40 in the closing direction.

Figure 13A:
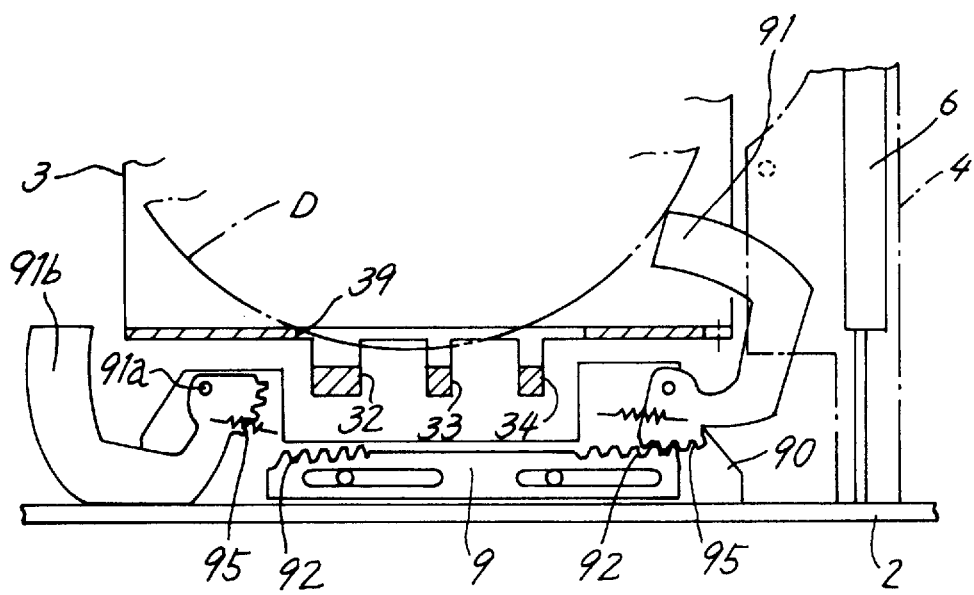
FIGS. 13, (a) and (b) are side elevations in section showing the mechanism for transporting the disk between the playback portion and the disk space, (a) showing the disk as inserted from the playback portion and supported by a kickout piece, and (b) showing the mechanism while kicking out the disk toward the playback portion.
Figure 13B:
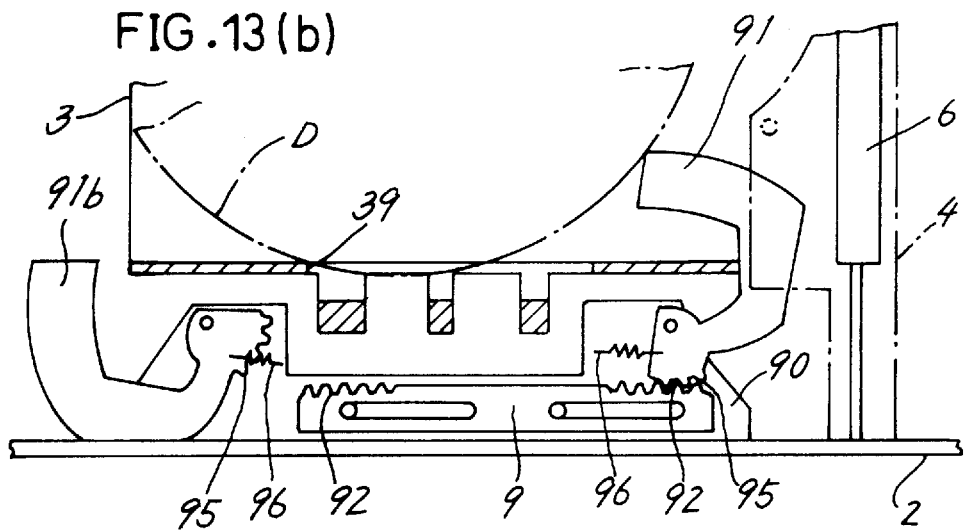

FIGS. 12 and 13 are views showing the holding plate 90 as viewed from the left side thereof. Two kickout pieces 91, 91b movable into the disk space 31 through the side wall of the magazine 3 are pivoted, each at a base end thereof, to the front and rear ends of the holding plate 90 as indicated at 91a. Each of the kickout pieces 91, 91b is formed on a portion of a peripheral edge thereof with a toothed face 95 meshable with the rack 92 of the drive slide 9. Each kickout piece kicks out the disk from the space 31 as will be described below.

A tension spring 96 connected between each kickout piece 91 or 91b and the holding plate 90 biases the kickout piece in a direction to cause a free end thereof to move out of the disk space 31 of the magazine 3. In a standby state wherein the disk is not inserted into the magazine 3, the free end of the kickout piece 91 toward the insertion-discharge portion 4 is downwardly away from the path of transport of the disk as seen in FIG. 12, (b).

In the standby state, on the other hand, the drive slide 9 is drawn toward the playback portion 7, with the other end of the pivotal lever 19 holding the standby position sensor switch SW10 depressed as shown in FIGS. 12, (b) and 18, (b). The kickout piece 91b toward the playback portion 7 has its toothed face 95 engaged with the rack 92 of the drive slide 9, and the free end of the piece 91b is advanced in the disk space 31 through the peripheral wall of the magazine 3. When the disk is inserted into the space 31 in this state, the disk is raised from the holding groove 39 of the space 31 and accommodated in the magazine 3, in an intermediate position in which the peripheral edge of the disk bears on the free end of the kickout piece 91b.

Further as seen in FIG. 18, (b), the projection 53 on the lock lever 52 is fitted to the positioning tooth 32a, restraining the rotation of the magazine 3.

[Playback Portion]

FIG. 14 is a perspective view of the playback portion 7, and FIG. 15 includes front views showing the playback portion 7 as partly broken away. The playback portion 7 comprises a case 70 provided upright on the chassis 2 for accommodating the disk as delivered from the magazine 3, and a pickup mount 71 pivoted to the upper end of the case 70 for rotatably clamping the disk within the case 70. A pickup (not shown) and a turntable 72 are provided on the mount 71 as is already known. On the other side of the case 70 opposite to the mount 71, a clamp 73 having a disk member 74 fittable to the turntable 72 is pivoted to a lower portion of the case 70. The case 70 has a side wall formed with an opening 75 permitting the upper portion of the clamp 73 to move into the case therethrough.

Arranged between the third roller unit 61 and the case 70 are a sensor SE9 for detecting passage of the disk, and a sensor SE10 for detecting arrival of the disk at a playback position (see FIG. 17).

Figure 16A:
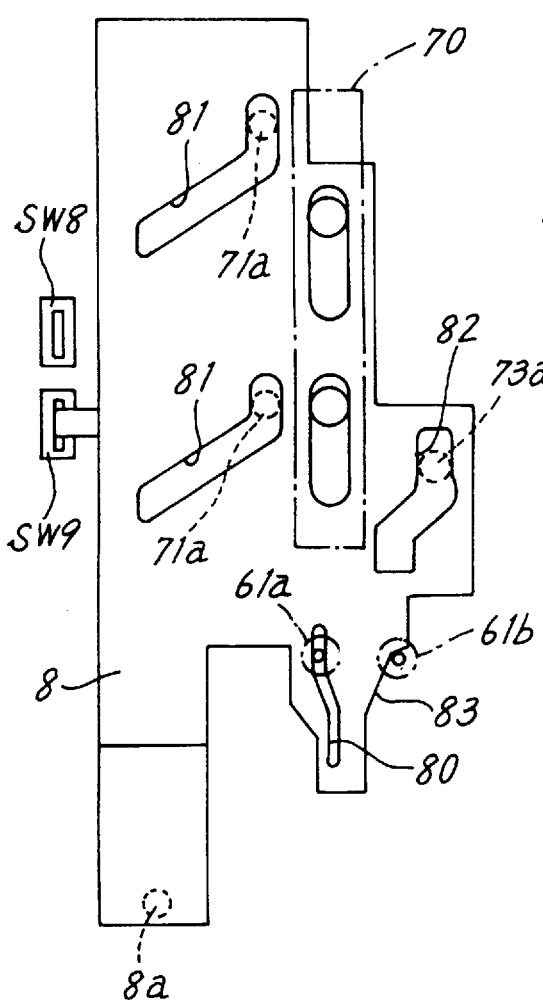
FIGS. 16, (a) and (b) are plan views of a chuck slide, (a) showing the chuck slide as moved toward the insertion-discharge portion, and (b) showing the slide as moved toward the playback portion.
Figure 16B:
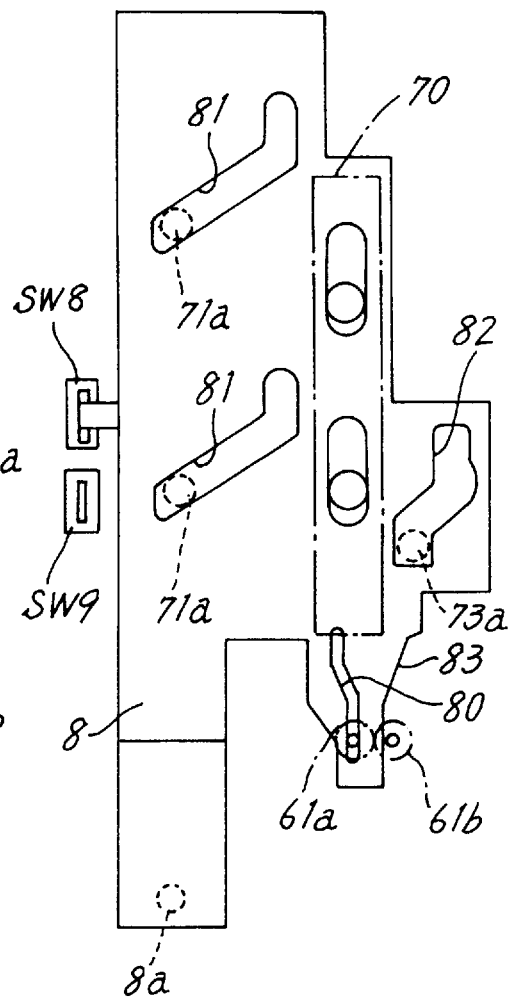
Figure 21:
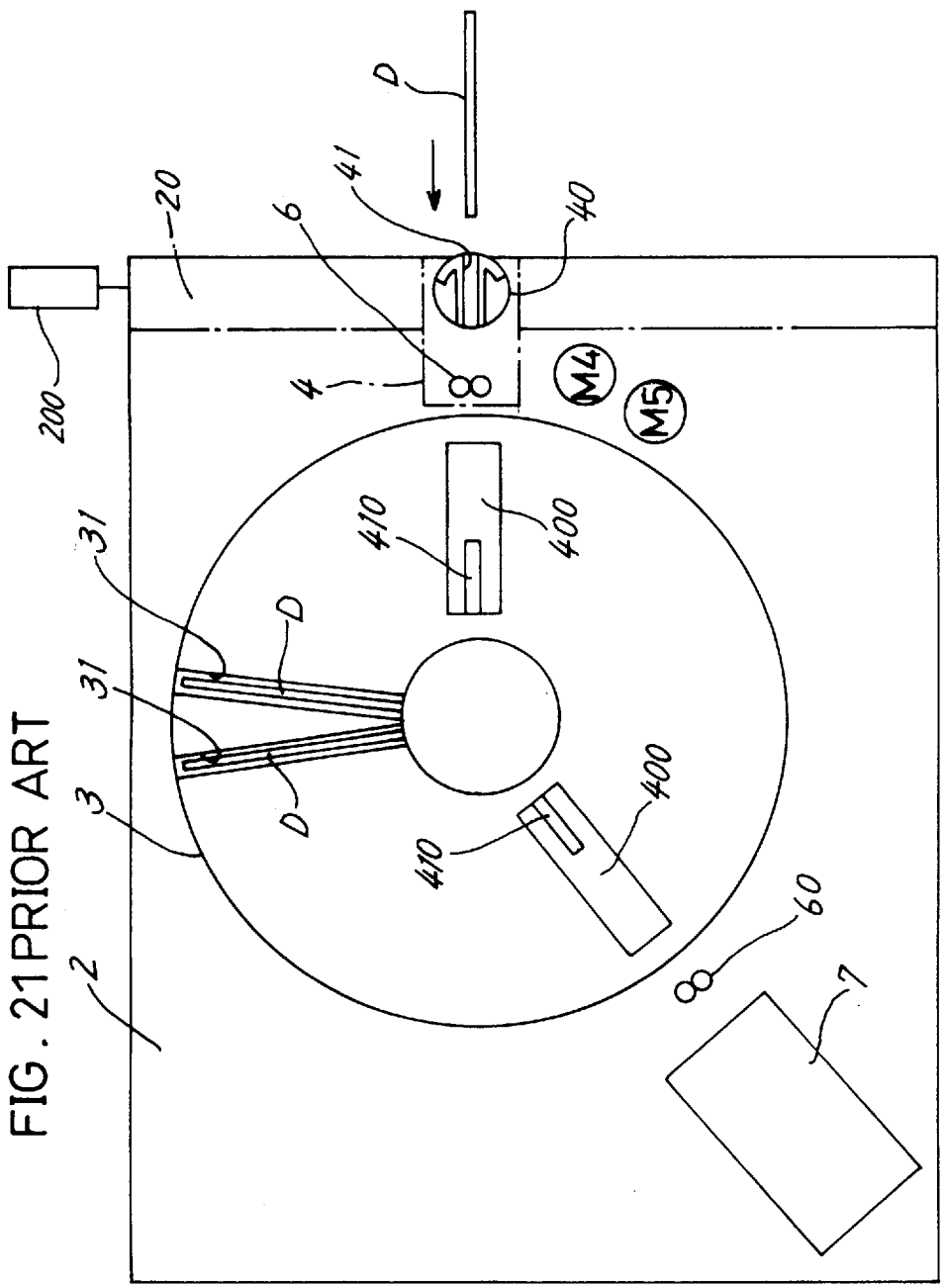
FIG. 21 is a plan view showing a conventional disk playback device.
Figure 22:
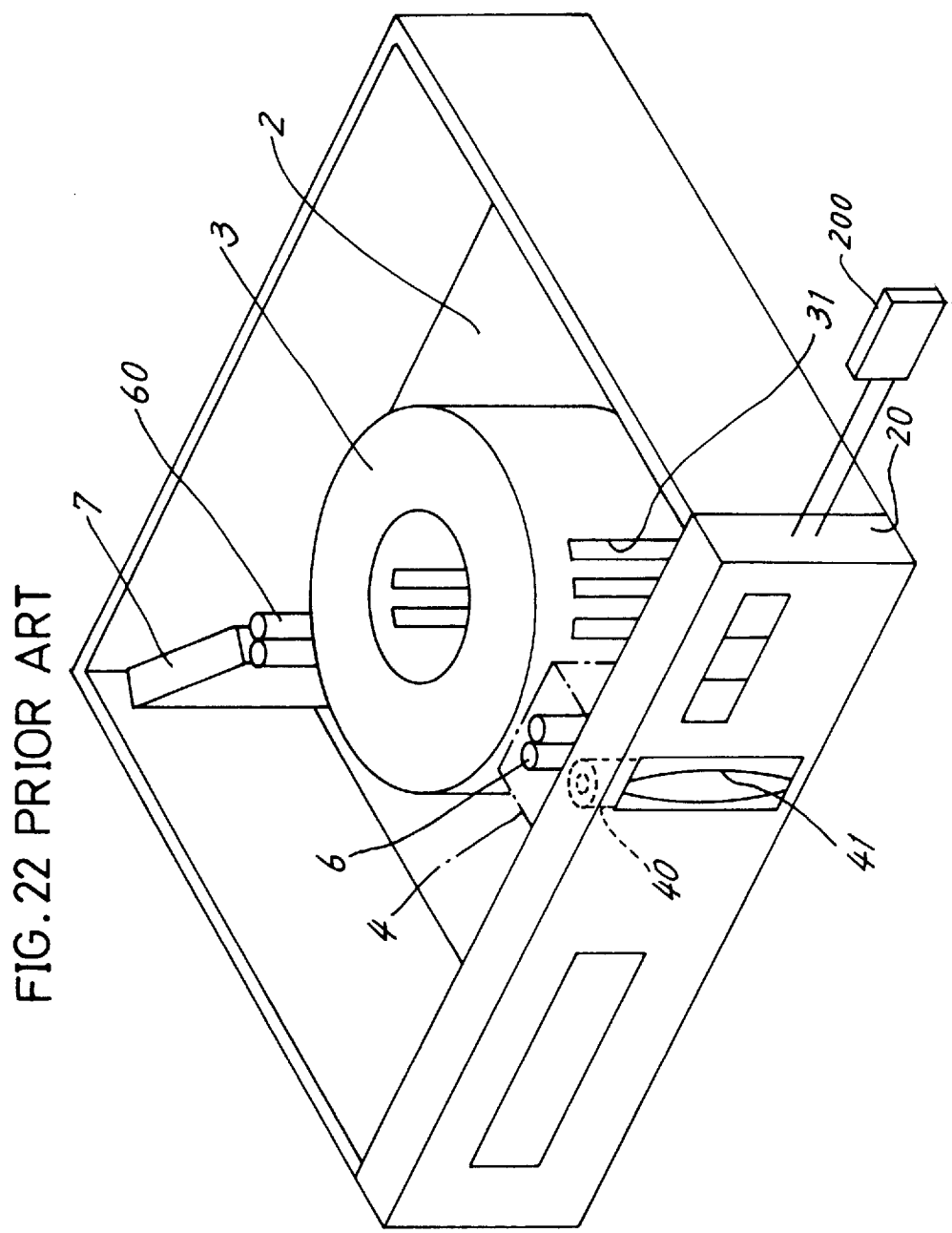
FIG. 22 is a perspective view of the same.
Figure 23:
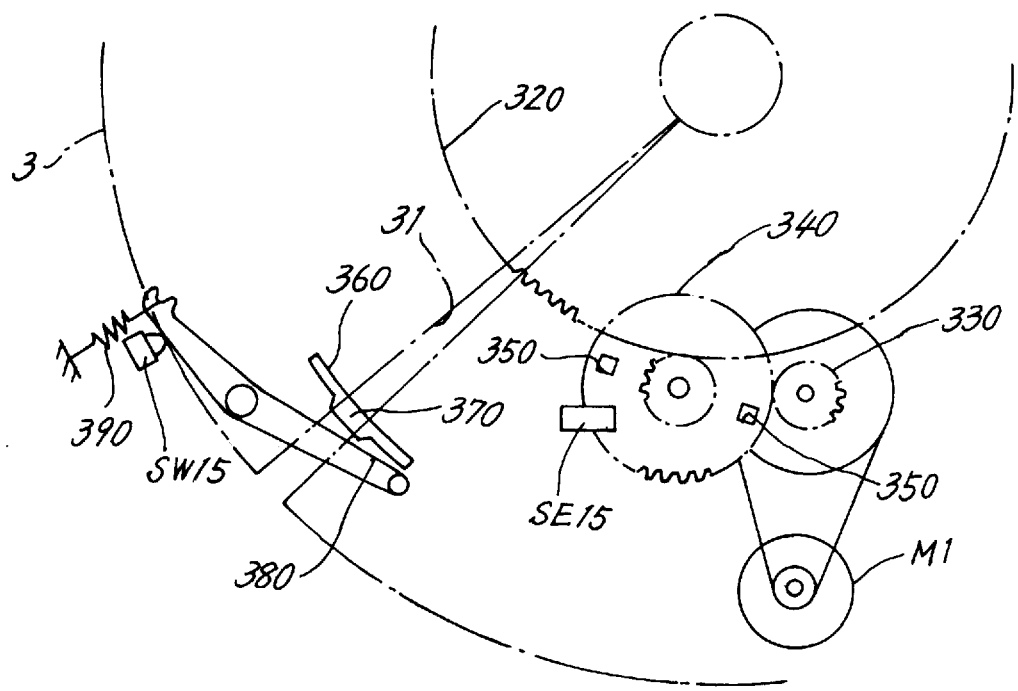
FIG. 23 is a plan view of a magazine position detecting mechanism included in the conventional disk playback device.

The chuck slide 8 slidable on the chassis 2 in the disk transport direction is disposed below the third roller unit 61 and the playback portion 7. As shown in FIGS. 14 and 16, the chuck slide 8 is formed with a roller opening-closing groove 80, roller opening-closing face 83, mount opening-closing grooves 81, 81 and a clamp opening-closing groove 82. Arranged in the path of movement of the chuck slide 8 are a clamping completion switch SW9 and a clamp release switch SW8 which are to be depressed by the slide 8. The lower end of the roller 61a of the third roller unit 61 is fitted in the roller opening-closing groove 80, while the lower end of the other roller 61b is in contact with the roller opening-closing face 83. The pickup mount 71 has lower end pins 71a fitting in the respective mount opening-closing grooves 81, and the clasp 73 fits in the clamp opening-closing groove 82.

A pin 8a projecting from the chuck slide 6 is engaged in the first cam groove 11 of the first cam gear 10. In the standby state, the slide 8 holds the clamping completion switch SW9 depressed, with the two rollers 61a, 61b of the third roller unit 61 spaced apart as seen in FIG. 16, (a).

As shown in FIG. 15, (a), a pin 73a projecting from the clamp 73 is pushed along the clamp opening-closing groove 82, and the disk member 74 moves into the case 70 through its opening 75, fitting to the mount 71, i.e., to the turntable 72 on the mount 71, and rendering the disk D rotatable with its central portion lightly held by the disk member 74.

When the chuck slide 8 moves toward the playback portion 7, the rollers 61a, 61b of the third roller unit 61 move along the groove 80 and the face 83, respectively, to come into contact with each other as shown in FIG. 16, (b). The chuck slide 8 depresses the clamp release switch SW8, and pins 71a at the lower end of the pickup mount 71 are pushed along the mount opening-closing grooves 81, whereby the mount 71 is pivotally moved away from the case 70 as seen in FIG. 15, (b). The clamp 73 rotates about its pivots, moving the disk member 74 out of the case 70 through the side wall thereof.

[Disk Transport Operation (see FIGS. 8, 10, 12, 13, 18 to FIG. 20)]

In a standby state, a disk is inserted into the magazine 3 by the following operation. In the standby state, the first cam gear 10 and the kickout piece 91 are so positioned as shown in FIGS. 12, (b) and 18, (b), ready for the insertion of the disk.

The front panel 20 is manipulated first to rotate the motor M. The right roller 6b of the first roller unit 6 rotates. When the disk D is passed through the opening 41 of the rotary shutter 40, causing the rollers 6a, 6b to hold the disk therebetween, the disk D is drawn into the magazine 3, rolling into one of the disk space 31. Upon the disk D passing through the first roller unit 6, the periphery of the disk comes into contact with the free end of the inner kickout piece 91b.

When the passage of the disk is detected by the sensors SE3 to SE6 (see FIG. 6) of the insertion-discharge portion 4, the motor M2 rotates, rotating the first cam gear 10 clockwise as shown in FIG. 18, (c). The pivotal lever 19 rotates along the second cam groove 12 of the first cam gear 10 to move the drive slide 9 toward the insertion-discharge portion 4. The lock lever 52 and the intermediate lever 43 remain at rest, with the magazine 3 restrained from rotating.

As previously stated, the disk acts to roll into the holding groove 39 of the disk space 31 under gravity. As the drive slide 9 moves rearward from the state shown in FIG. 12, (b), the kickout piece 91b toward the playback portion 7 is rotated from the aforementioned intermediate position by the tension spring 96 to escape from the path of transport of the disk. With the rotation of the kickout piece 91b, the disk gradually falls into the holding groove 39 while in contact with the kickout piece 91b and is accommodated in the space 31. By allowing the disk to gradually fall into the groove 39, the noise to be otherwise produced upon the disk D coming into striking contact with the edge of the groove portion 39 can be eliminated.

When the drive slide 9 depresses the intermediate position sensor switch SW2 as shown in FIG. 18, (c), the motor M2 stops. The kickout piece 91b completes its rotation. FIG. 12, (a) shows the piece 91b as downwardly retracted from the path of transport of the disk. When the disk passes through the insertion-discharge portion 4, the sensors SE7, SE8 are actuated, and the processor 200 stops the motor M3 rotating the first and second units 6, 60 and stores data indicating that the disk has been placed into the disk space 31.

After the front panel 20 is manipulated and until the disk is completely inserted into the magazine 3, the rollers of the first and second roller units 6, 60 continue to rotate in directions opposite to each other. Even when the device is so tilted in its entirety that the insertion-discharge portion 4 is at a higher level when the disk is inserted, the second roller unit 60 toward the playback portion 7 is rotating toward the disc discharge direction, so that the disk, if slipping outward from the interior of the magazine 3, is forced toward the magazine by the second roller unit 60. This obviates the likelihood that the disk will reach the playback portion 7 in error.

[Rotation of Magazine]

When a disk is to be inserted into the desired disk space 31, the identification number of the space 31 is input from the front panel 20. The motor M2 rotates, and the intermediate lever 43 rotates counterclockwise along the third cam groove 14 of the second cam gear 13 as shown in FIG. 19, (a). As seen in FIG. 7, (b), the lever 43 kicks the shutter opening-closing slide 45, rotating the rotary shutter 40. The opening 41 of the shutter 40 is closed, preventing other disk from being inserted into the magazine 3 during the rotation thereof.

The second cam gear 13 further rotates, rotating the lock lever 52 clockwise along the fourth cam groove 15 as shown in FIG. 19, (b). This moves the projection 53 on the lever 52 away from the positioning ring 32 of the magazine 3, while causing the other end of the lock lever 52 to depress the unlocking sensor switch SW4. A signal from the switch SW4 stops the motor M2, and the motor M1 thereafter rotates to drive the magazine 3.

As previously stated, the sensor SE1 counts the hollow windows 36 in the first rib ring 33 which move past the sensor. The count of the sensor SE1 indicates that the desired disk space 31 has been positioned as opposed to the insertion-discharge portion 4, whereupon the processor 200 discontinues the rotation of the motor M1 to bring the magazine 3 to a halt.

The motor M2 resumes its rotation, rotating the lock lever 52 along the fourth cam groove 15 of the second cam gear 13 and bringing the projection 53 into engagement with the positioning ring 32 as seen in FIG. 19, (c).

[Transport to Playback Portion (see FIGS. 8, 12, 13, 18 and 20)]

The disk accommodated in the disk space 31 as opposed to the playback portion 7 is transferred from the space 31 to the portion 7 and then chucked by the portion 7 by the following operation.

The front panel 20 is manipulated to input a signal commanding playback. The motor M3 rotates to rotate the gears 62 of the second and third roller units 60, 61 toward a disk drawing-in direction. The first roller unit 6 rotates idly because the unit is away from the disk.

The first cam gear 10 is rotated clockwise from the position shown in FIG. 19, (c) by the rotation of the motor M2, moving the chuck slide 8 toward the playback portion 7 along the first cam groove 11 as seen in FIG. 20, (a). The projection 53 on the lock lever 52 is held in engagement with the positioning ring 32 of the magazine 3, preventing the magazine 3 from rotating inadvertently.

With reference to FIG. 16, (b), the chuck slide 8 depresses the clamp release switch SW8, which indicates that the slide 8 has completed its sliding movement. In this state, the two rollers 61a, 61b of the third roller unit 61 come into contact with each other as previously stated, and the two rollers 61a, 61b rotate.

On the other hand, the pickup mount 71 and the clamp 73 rotate to move away from each other and become ready to accept the disk.

When the first cam gear 10 further rotates clockwise, the pivotal lever 19 rotates clockwise along the second cam groove 12 to move the drive slide 9 rearward as shown in FIG. 20, (c). The movement of the slide 9 rotates the kickout piece 91 closer to the portion 4 against the tension spring 96 as shown in FIG. 13, bringing the free end of the piece into the disk space 31 through the peripheral wall of the magazine 3. The kickout piece 91 kicks out the disk in the space 31 toward the playback portion 7. With the second and third roller units 60, 61 in rotation, the disk is drawn toward the unit 7 into the case 70 (see FIG. 17).

The pivotal lever 19 depresses the transport completion sensor switch SW3, while the sensors SE9, SE10 indicate the delivery of the disk D to the playback portion 7, whereupon the motor M2 rotates reversely to rotate the first cam gear 10 counterclockwise. The reverse rotation of the motor M2 returns the first cam gear 10 toward the direction of standby state.

With reference to FIG. 20, (a), the pivotal lever 19 rotates counterclockwise, pushing the drive slide 9 toward the playback portion 7. The kickout piece 91 toward the insertion-discharge portion 4 is freed from meshing engagement with the drive slide 9 and retracts from the path of transport of the disk [see FIG. 12, (a)].

With reference to FIG. 19, (c), the chuck slide 8 is then drawn toward the insertion-discharge portion 4. The pickup mount 71 and the clamp 73 engaging respectively in the mount opening-closing grooves 81 and clamp opening-closing groove 82 move toward each other to hold the central portion of the disk, while the two rollers 61a, 61b move away from each other [see FIGS. 15, (a) and 16, (a)].

The chuck slide 8 depresses the clamping completion switch SW9, whereupon the motors M2, M3 are deenergized to stop the rotation of the first cam gear 10 and the second and third roller units 60, 61. The first cam gear 10 comes to a halt at the position shown in FIG. 19, (c).

Although the rear end of the disk is positioned between the rollers 61a, 61b, the disk is rotatable since the rollers 61a, 61b are spaced apart. The disk is played back in this state. The playback operation to be performed after the mount 71 and the clamp 73 are fitted together is known.

[Unloading of Disk from Playback Portion]

The disk loaded in the playback portion 7 is taken out through the insertion-discharge portion 4 by the following procedure. First, a signal commanding withdrawal of the disk is input from the front panel 20, whereupon the motors M2, M3 rotate, moving the chuck slide 8 from the position shown in FIG. 19, (c), i.e., from the state wherein the disk is chucked by the playback portion 7, toward the portion 7 as seen in FIG. 20, (a). The rotation of the motor M3 rotates the roller 61b of the third roller unit 61.

The pickup mount 71 and the clamp 73 are opened to release the disk, and the rollers 61a, 61b of the third roller unit 61 are brought into contact with each other. As shown in FIG. 16, (b), the chuck slide 8 depresses the clamp release switch SW8, whereby completion of the sliding movement of the slide 8 is detected. The disk D is held between the rollers 61a, 61b and drawn toward the magazine 3 by the rotation of the third roller unit 61.

The first cam gear 10 rotates clockwise, whereby the drive slide 9 is moved toward the insertion-discharge portion 4. As seen in FIG. 20, (b), the pivotal lever 19 depresses the drawing sensor switch SW11, whereupon the motor M2 is temporarily halted. In this position, the free end of the kickout piece 91 toward the portion 4 is located within the disk space 31 as shown in FIG. 13, (a).

When the sensor SE9 detects passage of the disk D, the motor M2 rotates reversely. The first cam gear 10 rotates counterclockwise, causing the pivotal lever 19 to move the drive slide 9 toward the playback portion 7. With the motor M3 in reverse rotation, the first roller unit 6 rotates in a disk discharge direction.

Referring to FIG. 12, (a), the kickout piece 91 toward the portion 4 rotates to retract from the path of transport of the disk, permitting the disk to be gradually inserted into the disk space 31. After the disk is accommodated in the magazine 3, further rotation of the motor M2 rotates the first cam gear 10 counterclockwise, drawing the chuck slide 8 toward the insertion-discharge portion 4 [see FIG. 19, (c)]. The intermediate lever 43 thereafter rotates as shown in FIG. 18, (c) to move the shutter opening-closing slide 45 leftward and open the rotary shutter 40.

With reference to FIGS. 12, (c) and 18, (a), the drive slide 9 further moves toward the playback portion 7, rotating the kickout piece 91b near the portion 7 to kick out the disk toward the portion 4. The disk is held between the rollers 6a, 6b of the first roller unit 6, passed through the portion 4 and discharged to the outside of the device.

The pivotal lever 19 depresses the kickout sensor switch SW1, whereupon the motor M2 is halted. The sensors SE3 to SE6 detect delivery of the disk, whereupon the motor M2 reversely rotates, moving the pivotal lever 19 clockwise. When the lever 19 depresses the standby position sensor switch SW10, the motor M2 stops, and the device resumes the standby state.

In stopping the magazine 3 according to the present embodiment, the sensor SE2 detects the reset detecting portion 37 which corresponds to the disc space 31 of detected identification number, so that the rotated position of the magazine 3 is detectable by simple means. Further the rotated position of the magazine 3 is discerned by detecting one of the plurality of reset detecting portions 37, and is therefore detectable more quickly than in the conventional device.

Although the reset detecting portion 37 and the position index 38a are each in the form of a recess, each of the portion and the index may be formed, for example, by a reflecting plate so as to be detected by a sensor comprising a light receiving portion and a light emitting portion. Alternatively, the reset detecting portion 37 and the position index 38a may each be in the form of a projection so as to be detected by a contact switch.

What is claimed is:

1. A disk playback device, comprising:
   a magazine rotatably mounted on a chassis and formed with disk spaces in a radial arrangement for accommodating a plurality of disks positioned upright, the disk spaces being given respective identification numbers;

an insertion-discharge portion provided externally of the magazine for permitting the disk to pass therethrough; and a processor for controlling the rotation of the magazine, determining what identification number the disk space has which space is opposed to the insertion-discharge portion and storing the determined identification number, wherein the magazine has a plurality of reset detecting portions providing a reference for stopping the magazine and arranged concentrically with the magazine at approximately equal spacings in corresponding relation with specified disk spaces, a position index group being disposed at the midportion between each two adjacent reset detecting portions and comprising a plurality of position indexes arranged in the direction of rotation of the magazine for detecting the identification number of the disk space to which the reset detecting portion, toward the direction of rotation of the magazine, of the two portions corresponds, the position index groups being different in the number of position indexes, where the first distance between opposite ends of each position index group is smaller than the second distance from each end of the group to the reset detecting portion closest to the end; a single sensor is provided on a path of rotation of the magazine on the chassis and connected to the processor for detecting one of the reset detecting portions and the position index group subsequent to the portion and stopping the rotation of the magazine upon detecting the portion; and the processor is operable to measure a predetermined period of time greater than a period of time taken for the first distance to move past the sensor with the rotation of the magazine and shorter than a period of time for the second distance to move past the sensor with the rotation, the processor being operable to rotate the magazine when a power source is initially turned on and said identification number data of the magazine stored in the processor has disappeared, said processor having the functions of counting the number of reset detecting portions or position indexes detected by the sensor within the predetermined period of time after the reset detecting portion or the position index is first detected by the sensor, and of detecting the identification number of the disk space corresponding to the reset detecting portion subsequently detected by the sensor, based on the number counted.

2. A method of controlling a disk playback device, as mounted on a chassis, a magazine formed with a plurality of disk spaces in a radial arrangement for accommodating disks as positioned upright, an insertion-discharge portion provided externally of the magazine for permitting the disk to pass therethrough, a sensor positioned on a path of rotation of the magazine, and a processor for storing therein an identification number of the disk space as opposed to the insertion-discharge portion, the sensor being connected to the processor, the magazine having a plurality of reset detecting portions providing a reference in stopping the magazine and approximately equidistantly spaced apart concentrically about a center of rotation of the magazine in corresponding relation with disk spaces having respective predetermined identification numbers, a position index group being disposed at an intermediate position between each two adjacent reset detecting portions and comprising a plurality of position indexes arranged in the direction of rotation of the magazine for detecting the disk space of a predetermined identification number to which the reset detecting portion corresponds, the position index groups being different in the number of position indexes, the greatest of the first distances between opposite ends of the position index groups being smaller than the second distance from each end of the group having the greatest distance to the reset detecting portion closest to the end, the sensor being operable to detect the reset detecting portions and the position indexes, the processor being operable to measure a predetermined period of time greater than a period of time taken for the greatest first distance to move past the sensor and less than a period of time for the second distance to move past the sensor when a power source is initially turned on and said identification number data of the magazine stored in the processor has disappeared, the method comprising the steps of:

causing the processor to temporarily rotate the magazine;

counting the number of reset detecting portions or position indexes detected by the sensor within the predetermined period of time;

detecting from the counted number the identification number of the disk space corresponding to the reset detecting portion detected next by the sensor; and stopping the rotation of the magazine when the sensor subsequently detects the reset detecting portion.

* * * * *